(12) United States Patent
Elrod et al.

(10) Patent No.: US 12,179,920 B2
(45) Date of Patent: Dec. 31, 2024

(54) AIR DELIVERY BARREL SYSTEM

(71) Applicant: S.W.O.R.D. International Inc., Sparks, NV (US)

(72) Inventors: Jeremy Allen Elrod, Reno, NV (US); Christopher Collin Klaftenegger, Reno, NV (US)

(73) Assignee: S.W.O.R.D. International Inc., Greenville, SC (US)

( * ) Notice: Subject to any disclaimer, the term of this patent is extended or adjusted under 35 U.S.C. 154(b) by 0 days.

(21) Appl. No.: 18/045,356

(22) Filed: Oct. 10, 2022

(65) Prior Publication Data
US 2023/0257118 A1 Aug. 17, 2023

Related U.S. Application Data

(63) Continuation of application No. 17/127,542, filed on Dec. 18, 2020, now Pat. No. 11,465,745.

(60) Provisional application No. 63/067,758, filed on Aug. 19, 2020, provisional application No. 62/950,073, filed on Dec. 18, 2019.

(51) Int. Cl.
| | |
|---|---|
| *B64D 1/14* | (2006.01) |
| *B64D 1/08* | (2006.01) |
| *B64D 17/36* | (2006.01) |
| *B65D 81/02* | (2006.01) |
| *B64D 17/24* | (2006.01) |

(52) U.S. Cl.
CPC .............. *B64D 1/14* (2013.01); *B64D 1/08* (2013.01); *B64D 17/36* (2013.01); *B65D 81/02* (2013.01); *B64D 17/24* (2013.01)

(58) Field of Classification Search
CPC . B64D 1/08; B64D 1/14; B64D 25/12; B65D 81/02; B65D 81/027; B65D 81/3216
See application file for complete search history.

(56) References Cited

U.S. PATENT DOCUMENTS

| | | | | |
|---|---|---|---|---|
| 2,408,246 A | * | 9/1946 | Walter | B64D 1/02 |
| | | | | 229/5.5 |
| 2,454,616 A | * | 11/1948 | Schultz | B64D 1/02 |
| | | | | 206/583 |
| 2,582,113 A | * | 1/1952 | Finken | F42B 3/006 |
| | | | | 244/150 |

(Continued)

OTHER PUBLICATIONS

NPL Liftall LIFTBS32 (Year: 2014).*

*Primary Examiner* — Richard G Davis
(74) *Attorney, Agent, or Firm* — VLP Law Group, LLP

(57) ABSTRACT

An air delivery barrel system is described, the air delivery barrel system includes a strap system that provides line stretch of the strap system when a force is exerted on the strap system, the strap system including a continuous strap, a first barrel, the first barrel being formed out of a cylindrically shaped wall and the cylindrically shaped wall including a channel that the strap system passes through, an end cap, the end cap being detachably connectable to a bottom end of the first barrel, the end cap protecting a bottom portion of the strap system, a lid, the lid being detachably connectable to a top end of the first barrel, the lid including a recess through which the strap system passes through, and a second barrel that can be situated within the first barrel and the cylindrically shaped wall of the first barrel protects the second barrel.

20 Claims, 19 Drawing Sheets

(56) References Cited

U.S. PATENT DOCUMENTS

| | | | | |
|---|---|---|---|---|
| 2,668,732 | A * | 2/1954 | Carlson | B66C 1/18 |
| | | | | 294/75 |
| 6,511,018 | B1 * | 1/2003 | Parson | B64D 1/14 |
| | | | | 244/137.1 |
| 2003/0197095 | A1 * | 10/2003 | Preston | B64D 17/38 |
| | | | | 244/152 |
| 2004/0051006 | A1 * | 3/2004 | Warren | B64D 19/00 |
| | | | | 244/138 R |
| 2006/0102581 | A1 * | 5/2006 | Yates, III | B65D 81/3216 |
| | | | | 215/6 |
| 2012/0228432 | A1 * | 9/2012 | Fox, Jr. | B64D 17/22 |
| | | | | 244/137.1 |

\* cited by examiner

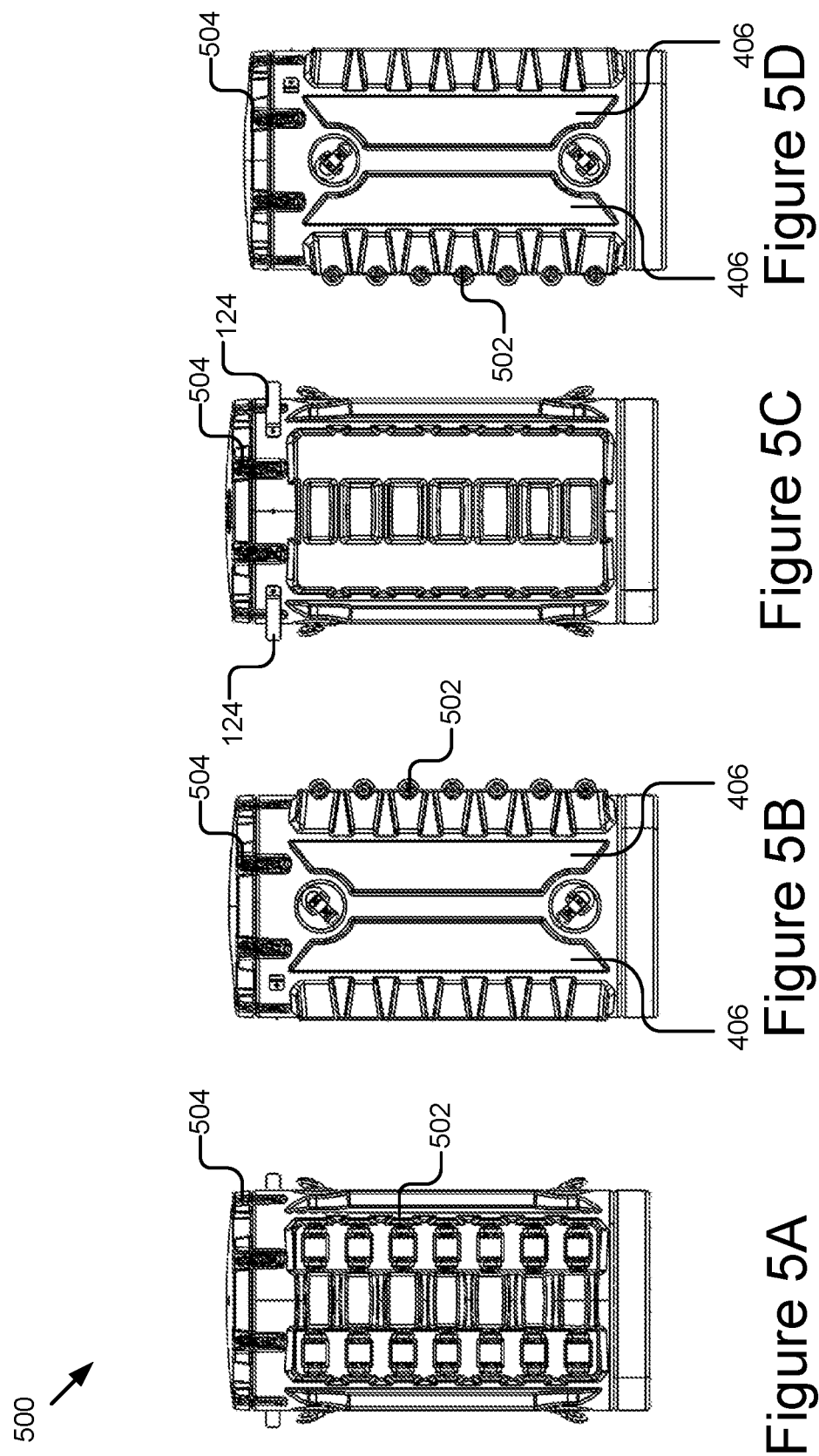

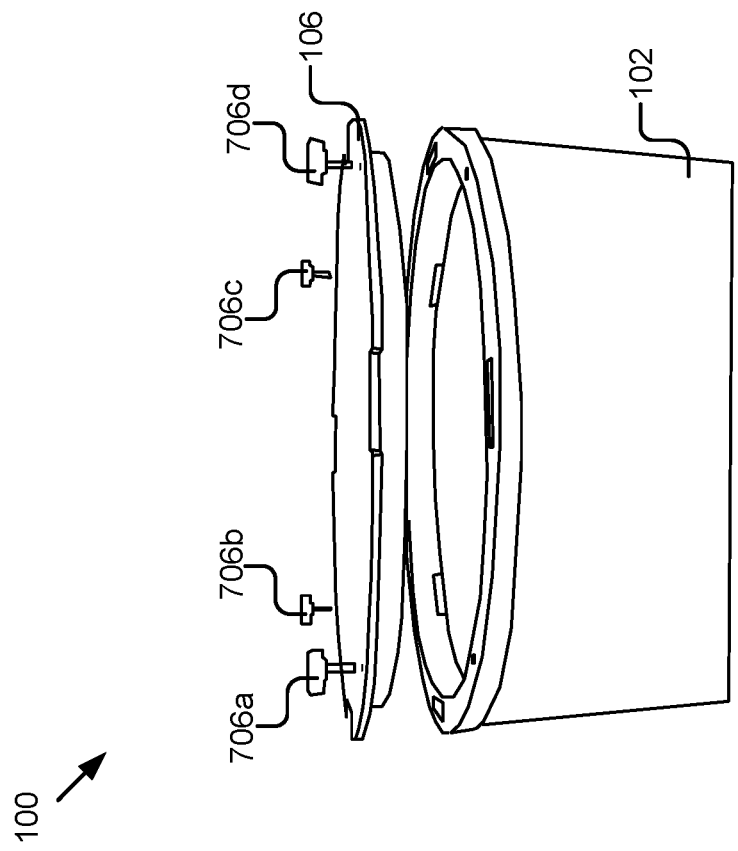
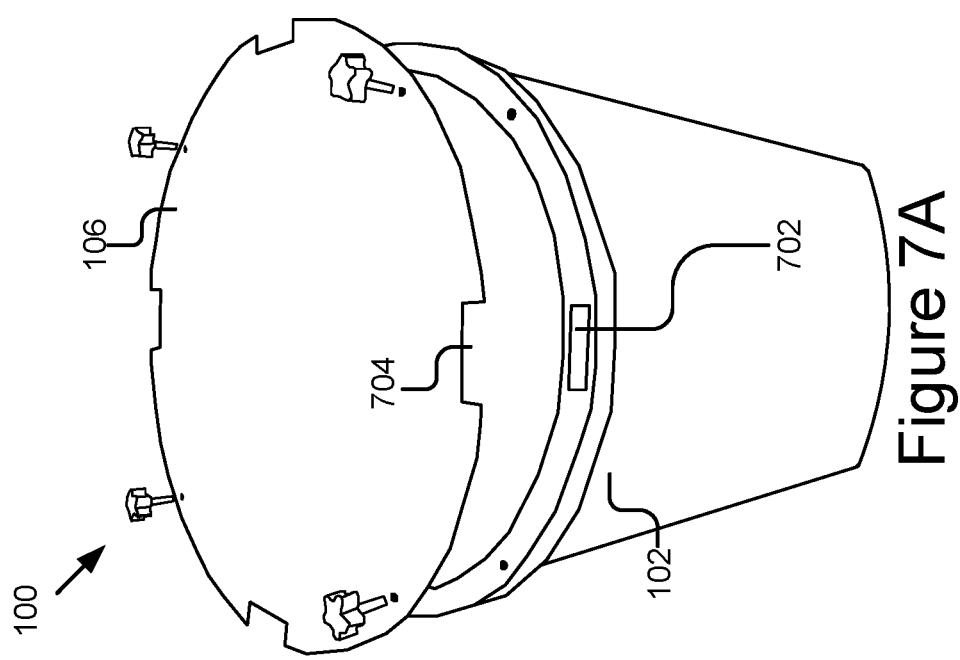
Figure 7B
Figure 7A

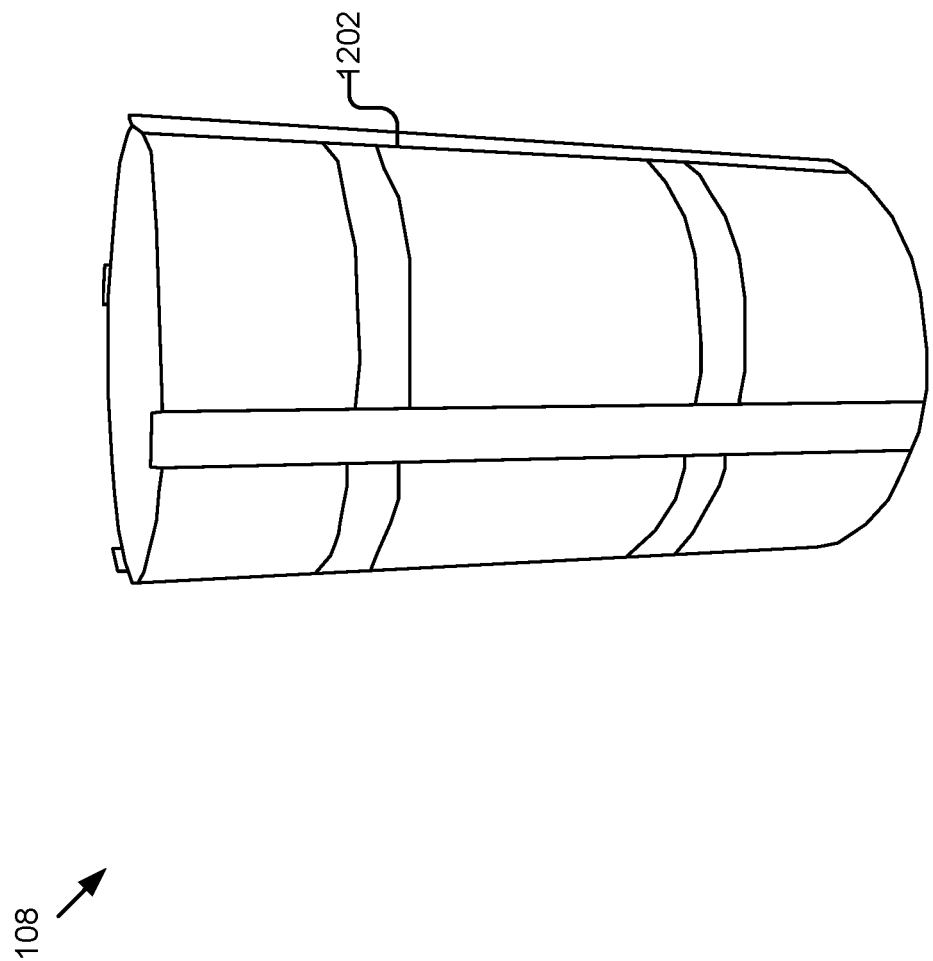

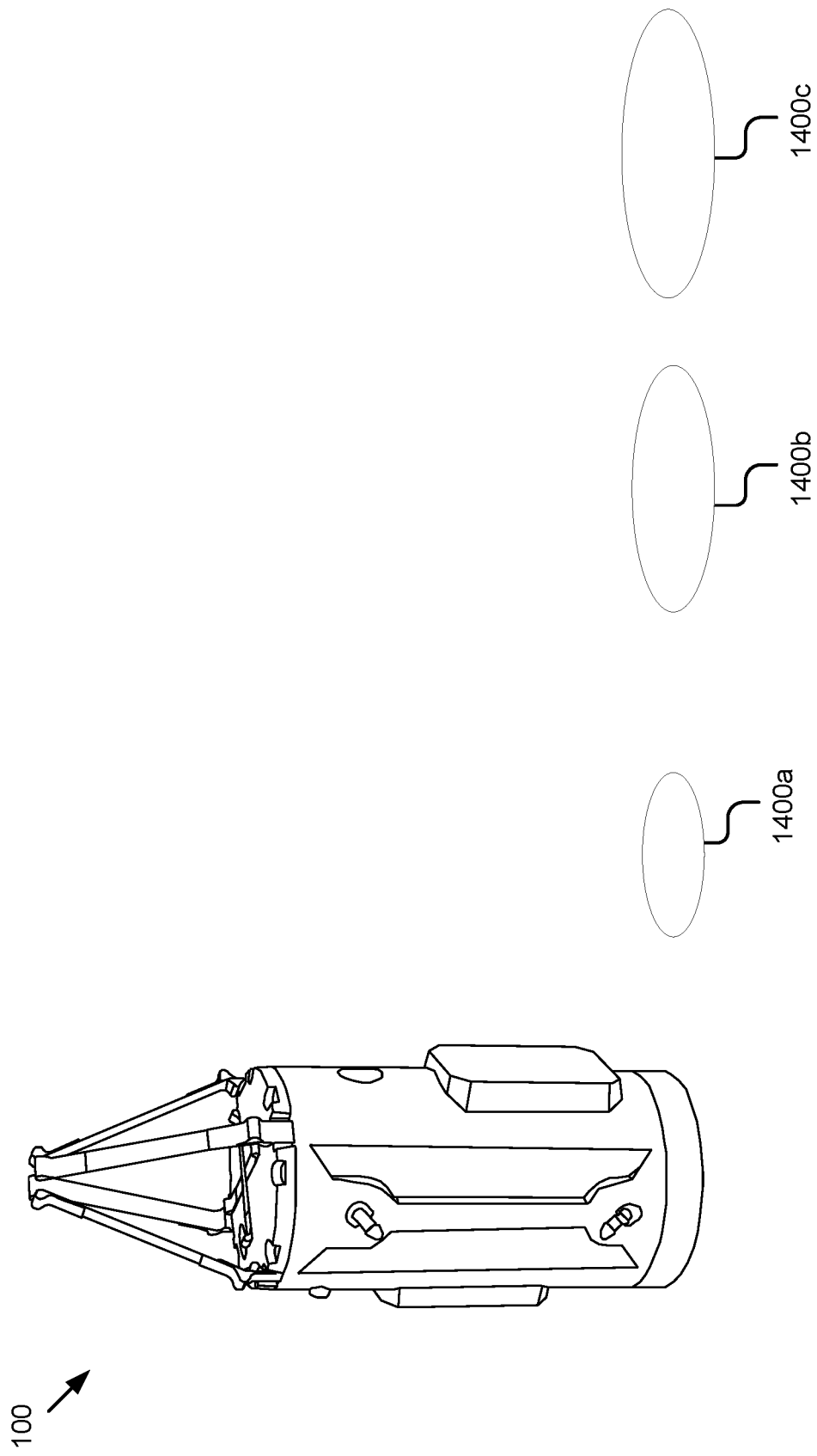

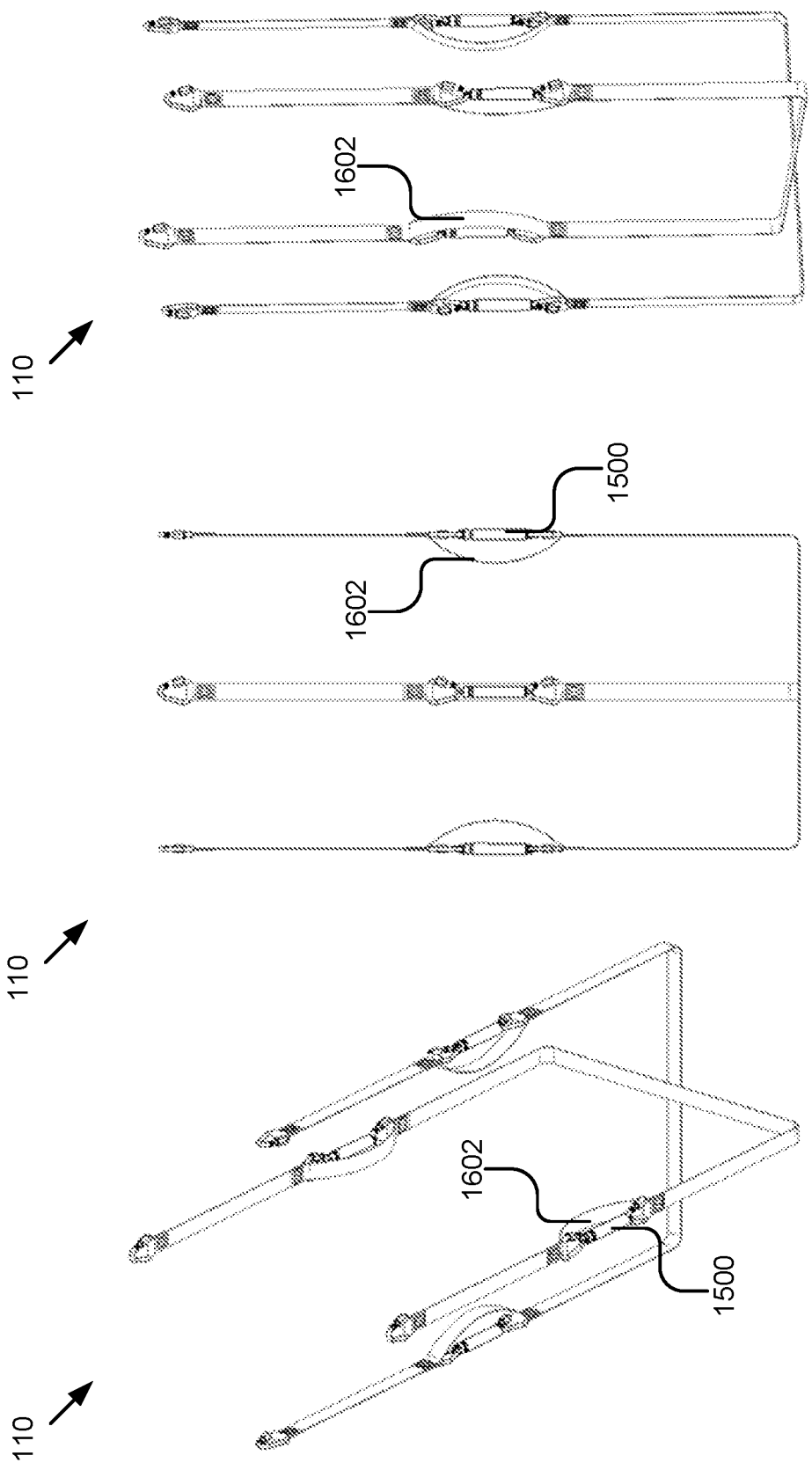

AIR DELIVERY BARREL SYSTEM

CROSS-REFERENCE TO RELATED APPLICATIONS

This application claims the benefit of priority under 35 U.S.C. § 119(e) to U.S. Application No. 62/950,073, filed Dec. 18, 2019, entitled Air Delivery Barrel System, the contents of which are hereby incorporated herein by reference. This application also claims the benefit of priority under 35 U.S.C. § 119(e) to U.S. Application No. 63/067,758, filed Aug. 19, 2020, entitled Air Delivery Barrel System, the contents of which are hereby incorporated herein by reference.

BACKGROUND

The present disclosure relates to an air delivery barrel system.

An air delivery system is used to deliver a payload out of an aircraft. Common ways that air delivery systems are deployed include a payload released either in a tandem jump with a tandem jumper or separately using a static line parachute. These current processes for air delivery systems are inefficient in cost, set-up time, and functionality. For instance, the materials of the air-delivery system are designed to be used for a single delivery and are often damaged during delivery. In addition, these air delivery systems have to be carefully prepared and packaged which takes multiple steps to complete and makes these air delivery systems difficult to setup and use.

SUMMARY

According to one innovative aspect of the subject matter in this disclosure, an air delivery barrel system is described. In an example implementation, an air delivery barrel system may include: a strap system that provides line stretch of the strap system when a force is exerted on the strap system, the strap system including a continuous strap; a first barrel, the first barrel being formed out of a cylindrically shaped wall and the cylindrically shaped wall including a channel that the strap system passes through; an end cap, the end cap being detachably connectable to a bottom end of the first barrel, the end cap protecting a bottom portion of the strap system; a lid, the lid being detachably connectable to a top end of the first barrel, the lid including a recess through which the strap system passes through; and a second barrel that can be situated within the first barrel and the cylindrically shaped wall of the first barrel protects the second barrel.

Implementations may include one or more of the following features. The air delivery barrel system also includes wherein the second barrel is removable from the first barrel. The air delivery barrel system also includes wherein the second barrel is modular. The air delivery barrel system wherein the strap system the line stretch absorbs a portion of the force. The air delivery barrel system wherein the continuous strap includes a first end that passes through the recess, the first end including an attachment loop. The air delivery barrel system wherein the recess of the lid is a first recess and the lid further includes a second recess and wherein a second end of the continuous strap passes through the second recess, the second recess being opposite the first recess on the lid. The air delivery barrel system wherein the first end of the continuous strap includes a first gear loop and the second end of the continuous strap includes a second gear loop, wherein the first gear loop prevents the first end of the continuous strap from sliding back into the channel and the second gear loop prevents the second end of the continuous strap from sliding back into the channel. The air delivery barrel system comprising integrated cross straps, with or without gear loops that secure to quick release friction adaptors which aid in keeping the strap system from falling into the strap channels of the main barrel and also prevent shift of the strap system during the shack phases of the jump The air delivery barrel system wherein the strap system includes an integrated shock absorber. The air delivery barrel system wherein the first barrel is one or more of watertight and dust proof when the end cap and the lid are connected to the main barrel. The air delivery barrel system wherein the strap system may be one or more of type 7, type 8, and/or type 13 webbing strap in a single or double layer sewn configuration. The air delivery barrel system wherein the end cap is designed to preserve the center of gravity of the air delivery barrel system. The air delivery barrel system wherein the end cap is a wheeled end cap. The air delivery barrel system further comprising a ballast plate that can be removable positioned within the first barrel, the ballast plate can be included within the interior barrel to bring a load weight of the main barrel to a specific parameter. The air delivery barrel system further comprising an impact plate that can be removable positioned within the first barrel, the ballast plate can be included within the interior barrel, the impact plate being configured to flex and dissipate impact energy. The air delivery barrel system wherein the first barrel includes an attachment mechanism that can be configured to receive a horizontal wheel plate and/or have the wheel carriage integrated into the outer wall of the aid delivery barrel system. The air delivery barrel system wherein the first barrel is double walled formed out of an interior wall and an exterior wall and the strap channel is positioned between the interior wall and the exterior wall. The air delivery barrel system further comprising a push handle integrated into the first barrel, the push handle protruding outwardly from an exterior surface of the first barrel.

One general aspect includes an air delivery barrel system including a first barrel including a strap channel located between an exterior wall and an interior wall of the first barrel, a strap system formed out of a continuous strap that passes through the strap channel of the first barrel, the strap channel being configured to reduce a shock on the first barrel, and a second barrel configured to be removably positioned within the first barrel and protected by the exterior wall and interior wall of the first barrel.

Implementations may include one or more of the following features. The air delivery barrel system wherein the first barrel is configured in one of a vertical configuration and a horizontal configuration.

One general aspect includes an air delivery barrel system including a first barrel that houses a strap channel that runs from a top side of the first barrel to a bottom side of the first barrel, a second barrel configured to be positioned within the first barrel and protected by the first barrel, and a strap system that passes through the strap channel and is configured to reduce a shock that is applied to the strap system.

The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 5A-5D illustrate another example configuration from a front view, a back view, a left side view, and a right-side view of an air delivery barrel system.

FIGS. 7A and 7B illustrates example configurations for components of an air delivery barrel system.

FIG. 12 illustrates an example configuration of an interior barrel.

FIG. 14 illustrates an example configuration of different base cap embodiments of an air delivery barrel system.

FIGS. 16A-16G illustrate an example strap configuration of an air shock absorption strap system.

DETAILED DESCRIPTION

Figure 1:
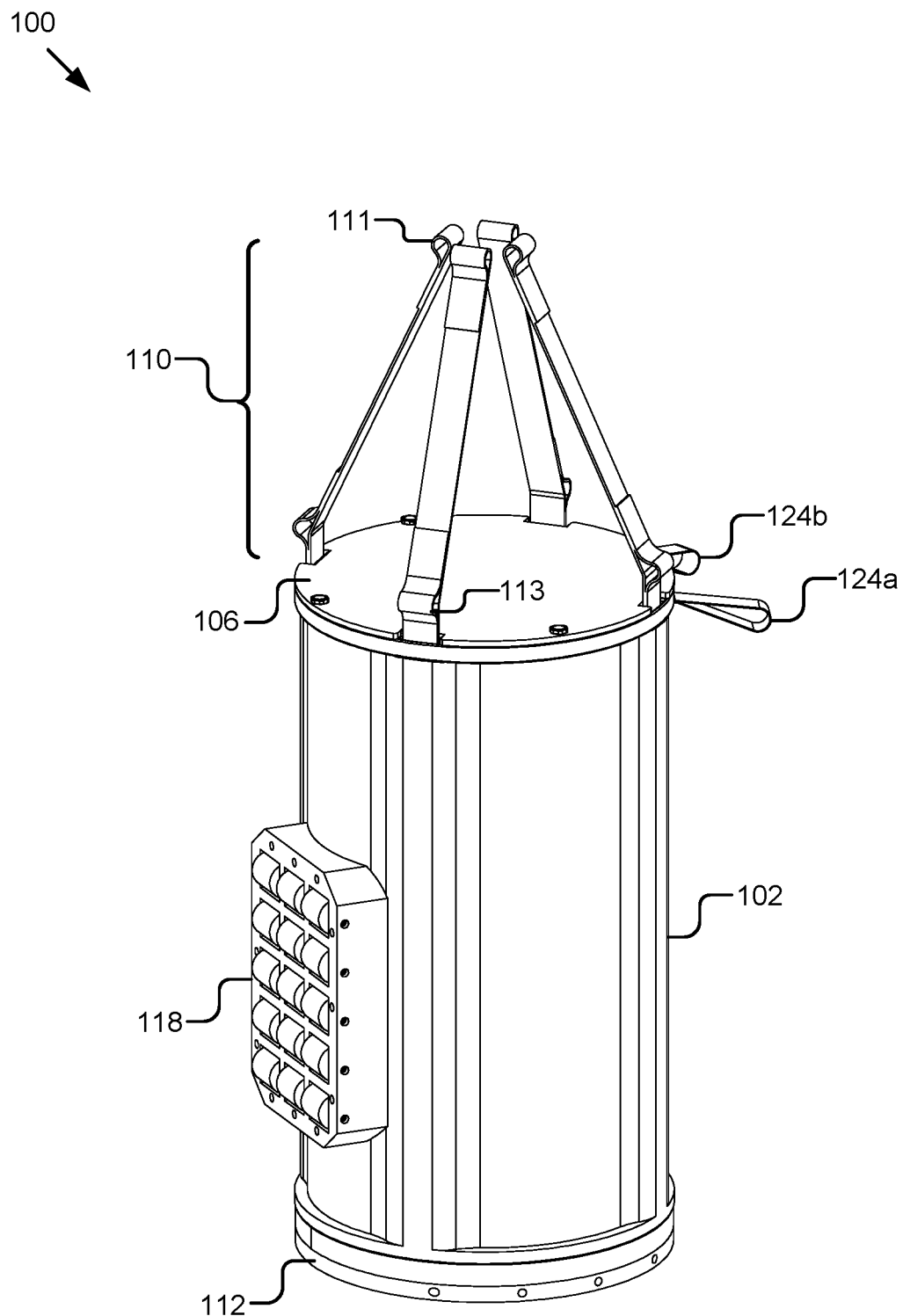
FIG. 1 illustrates an example configuration for an air delivery barrel system.

FIG. 1 illustrates an example configuration of an air delivery barrel system 100. The air delivery barrel system 100 is a reusable, modular container system that can transport payloads for air delivery. Example delivery options include deploying the air delivery barrel system from an aircraft for an air-to-land delivery or an air-to-sea delivery. The modular container system in the example includes a main barrel 102, an end cap 112, a lid 106, and a strap system 110 to deliver the payload. By using the modular container system with various components, the air delivery barrel system is reusable and easy to package. In addition, in a situation where a component is damaged during delivery of the payload, the individual component can be replaced and the other components reused in future payload deliveries which reduces the cost both for missions and trainings.

Figure 2:
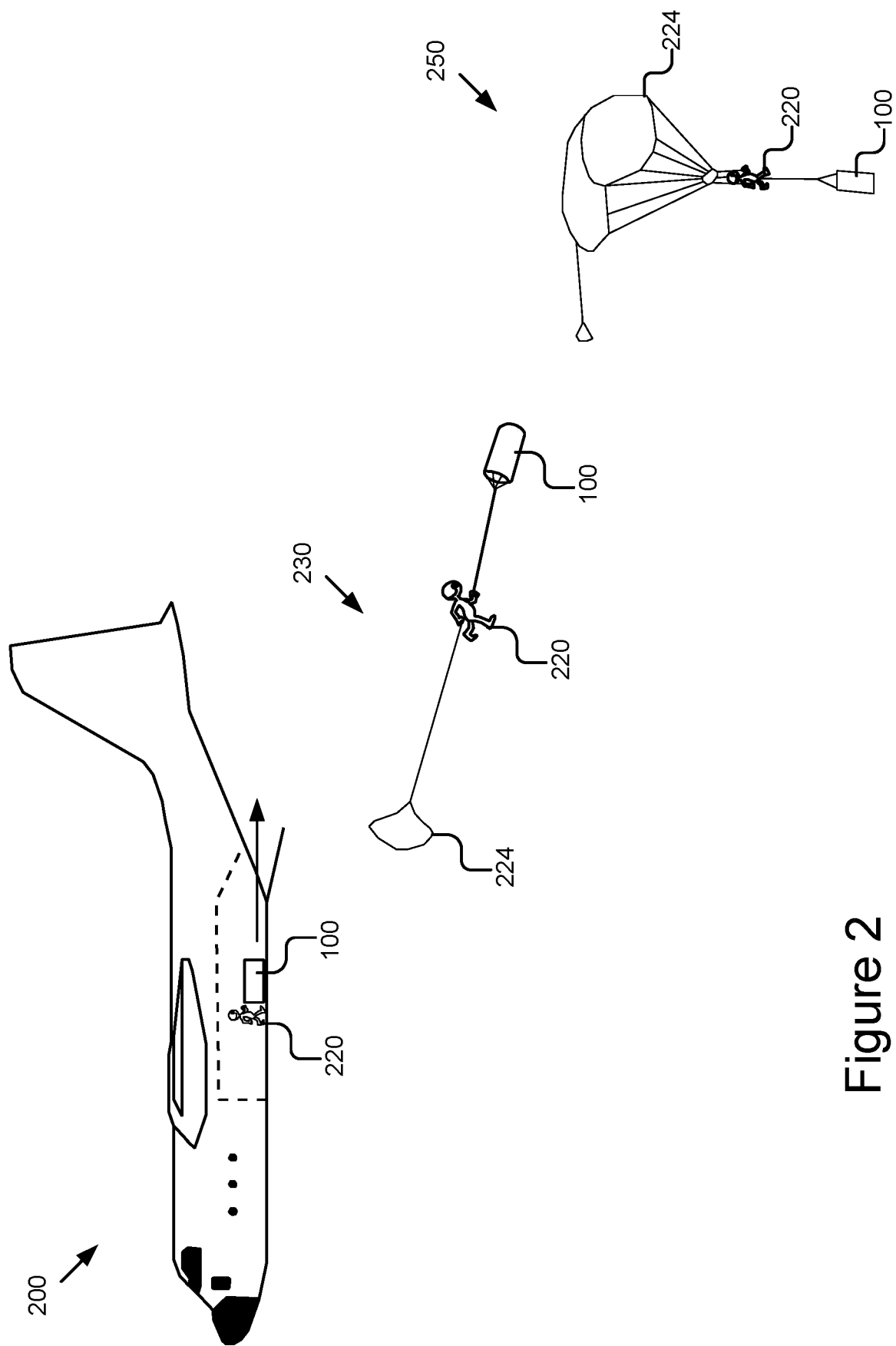
FIG. 2 illustrates an example embodiment for an air delivery barrel system.

FIG. 2 shows an example embodiment of the stages of an air delivery barrel system. The air delivery barrel system illustrated in the example configuration 200 may be deployed as part of a tandem tethered bundle. In the first stage of this system, the air delivery barrel system 100 is positioned inside of an aircraft and tethered to a jumper 220. During the first stage 200 of this system, the air delivery barrel system 100 and the jumper 220 deploy out of the aircraft. During the deployment from the aircraft, the air delivery barrel system 100 will descend to the end of the tether attached to the jumper 220 and exert an impact force (i.e., shock load) on the jumper and the payload that the air delivery barrel system is tethered to as they descend into freefall. This shock load is referred to as the exit shock.

During the second stage 230 of the system, the jumper 220 deploys a parachute 224 during freefall. The air delivery barrel system 100 exerts another impact force on the jumper 220 during deployment of the parachute 224 as the parachute 224 opens and rapidly decelerates the air delivery barrel system 100. This impact force can be referred to as the opening shock. During the third stage 250 of the system, the jumper 220 directs the parachute 224 and flies the air delivery barrel system 100 to a landing zone. The shock loads experienced during stage one 200 and stage two 230 of deployment pose risks to the jumper, the parachute system, and/or the payload integrity, where the shock load could cause physical damage to the parachute and/or rigging, a physical injury to the jumper, and/or payload damage. Additionally, the shock load on the parachute system decreases the service life of the parachute system, and by reducing the shock load, the cost to maintain and/or replace the parachute system decreases.

In another embodiment, the air delivery barrel system 100 may be deployed out of an aircraft using a parachute and a static line without a tandem jumper. The parachute for the air delivery barrel system 100 may be attached to the strap system 110 and the parachute release may be attached to the static line inside the aircraft. When the air delivery barrel system is deployed out of the aircraft, the static line becomes taut and deploys the parachute.

As shown in FIG. 1, the example air delivery barrel system 100 includes the strap system 110 that allows for full line stretch during the impact phases to reduce the shock load. By using the strap system 110 to connect the air delivery barrel system 100 to a parachute 224, either in a tandem jump with a jumper (as shown in FIG. 2) or off a static line during independent delivery, the strap system 110 can stretch and absorb some of the shock load as the air delivery barrel system 100 pulls on the strap system 110 during deceleration. The air delivery barrel system 100 employs unique strap channels (as shown in FIGS. 7 and 8) to maximize the full line stretch and allow the strap system 110 to absorb more shock load than previous solutions. Additionally, previous solutions diminished the line stretch further by also employing cross-members sewn into the straps in order to keep the straps from shifting. By using the example air delivery barrel system with the strap system 110 that maximizes line stretch, the air delivery barrel system provides a safer and lower risk payload delivery as compared to previous solutions while also preventing strap shifting through the use of the strap channels.

Figure 3:
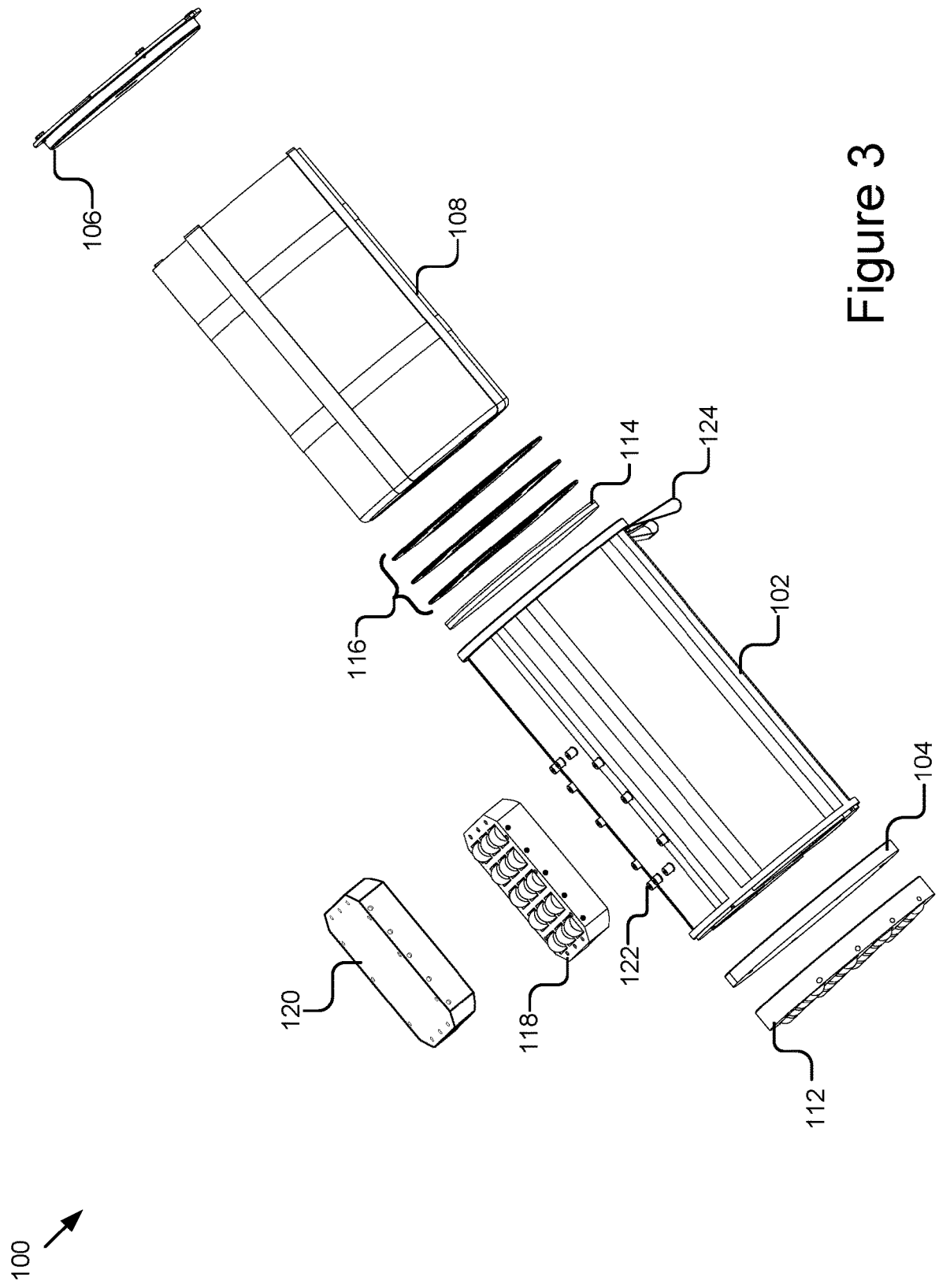
FIG. 3 illustrates an exploded view of an example configuration for an air delivery barrel system.

As shown in FIGS. 1 and 3, the main barrel 102 may be cylindrical in shape with an opening at the top end. In some embodiments, the bottom end of the main barrel 102 may include strap channels as described with respect to FIG. 8B, while in other embodiments, the bottom end of the main barrel 102 may also include an opening. The main barrel 102 may be designed to protect an interior payload, such as an inner barrel 108, during storage, deployment, and landing of the interior payload. The main barrel 102 may be designed to be watertight and dust proof when the base cap 112 and the lid 106 are positioned on the bottom end and the top end of the main barrel 102. Additionally, the air delivery barrel system 100 may be dust ingress resistant, chemical resistant, flame resistant, and/or water resistant (such as IP67 rated to 1-meter submersion), when the base cap 112 and the lid 106 are installed on the main barrel 102. The base cap 112 and the lid 106 may be configured to detachably connect to the main barrel 102, as described in detail with respect to FIGS. 7 and 8.

The strap system 110 may include one or more continuous straps that pass through one or more strap channels (see strap channel 902 in FIGS. 9A and 9B) formed out of the wall of the main barrel 102. In some implementations, the strap system 110 may pass through a first strap channel on a side of the main barrel 102, cross along a bottom channel (see bottom channel 806 on FIG. 8B) of the main barrel 102 that is covered by the base plate 112 and then pass through a second strap channel on an opposite side of the main barrel 102. This allows a first end of the strap system 110 to extend out of one side of the top of the main barrel 102 and the second end of the strap system 110 to extend out of an opposite side of the top of the main barrel 102 as shown and allow for full line stretch of the strap system 110. It should be understood that any number of straps may be included in the strap system 110 configuration in order to accommodate various loads. In some embodiments, individual straps of the strap system 110 may have individual strap channels that they pass through, while in further embodiments, the straps may share strap channels. In some implementations, the strap system 110 may use one or more of type 7, type 8, and/or type 13 webbing strap in a single or double layer sewn configuration that may be secured, such as by double stitching, although it should be understood that a variety of strap materials may be used in various sizes and/or materials based on the specifications of the payload and the strength requirements.

As shown in FIG. 1, the ends of the straps may extend out of the top of the main barrel 102 and the air delivery barrel system 100 may be attached to a tandem jumper and/or parachute using an attachment loop 111 on the ends of the individual straps. In the example shown, each strap end has an attachment loop that receives an attachment mechanism (such as a carabiner) that is then attached to a deployment system. In some implementations, the attachment loop 111 may be formed by folding the end of the strap over itself and secured to form the attachment loop 111 (such as by stitching the folded over end together, or securing the ends by other mechanisms).

As shown in FIG. 1, the strap system may include one or more gear loops 113, as shown. In some implementations, the gear loops 113 may be additional pieces of strap system that have been attached to an interior and/or exterior side of the individual straps to create one or more loop in the additional piece of strap system. In some implementations, the gear loop 113 may prevent the individual strap from sliding into the strap channel (such as through a strap opening 704 in FIG. 7A) as the dimensions of the gear loop 113 exceed one or more of the dimensions of a strap channel opening. In other implementations, there are also integrated cross straps, with or without gear loops 113 that secure to quick release friction adaptors which aid in keeping the strap system from falling into the strap channels of the main barrel 102 and also prevent shift of the strap system 110 during the shack phases of the jump (such as a skydive). In further implementations, the gear loop 113 may be used to attach additional gear and/or equipment without having to open up the main barrel 102 and also still maximize line stretch of the strap system 110. In some implementations, the gear loop 113 may also provide a reference during preparation of the payload to keep the strap system 110 centered around the main barrel 102. In some embodiments, the attachment loop 11 and/or the gear loop 113 may attached accessories, such as a Smart Bundle Control Module that may be used to remotely control a parachute attached to the air delivery barrel system 100 and steer the system to a landing zone as described elsewhere herein.

In some embodiments, the strap system 110 may include one or more shock absorbers, as shown in FIG. 15, to mitigate and/or absorb some of the exit and/or opening shock. The shock absorbers may be positioned in line with the strap system 110 that extends out of the top of the main barrel 102 and as the exit and/or opening shock pulls on the strap system 110, the shock absorbers may stretch and/or flex to reduce the shock. In some embodiments, the shock absorbers may be integrated into or replace a portion of the strap system 110. In further embodiments, the shock absorbers may be coupled to the ends of the strap system 110, such as between the end of the strap and a swivel to the parachute bundle and/or tether. In some embodiments, the shock absorbers may be formed out of rubber or thermoplastic that is designed to absorb some of the shock. In some implementations, the shock absorbers may be a separate system as shown with respect to FIG. 15 described elsewhere herein.

As shown in FIG. 1, one or more push handles 124 may be included in the air delivery barrel system 100. In some embodiments, the push handles 124 may be formed out of webbing material that has been doubled over to create a loop and attached to the main barrel 102. In further embodiments, the push handles may be separate pieces that can be attached to the main barrel 102 and/or the lid 106, and formed out of plastic, webbing, metal, rubber, etc. In further implementations, the push handles may be molded and/or integrated into the main barrel 102 and/or the lid 106. In some embodiments, the push handles 124 may be attached to the side of the main barrel 102. The push handles 124 provide a mechanism for a person to easily manipulate the air delivery barrel system 100. For example, the push handles 124 may be positioned along a top edge of the main barrel 102 and protrude outward such that when the main barrel 102 is laid on its side (such as for horizontal deployment) the strap handles 124 may extend upward at an easily accessible point for a tandem jumper to hold onto them and push the air delivery barrel system out of the plane during deployment.

FIG. 3 illustrates an exploded view of an example configuration of an air delivery barrel system 100. As shown in the example configuration, the lid 106 and base cap 112 are removable from the main barrel 102. The interior barrel 108 may be configured to have a payload installed within and be positioned within the main barrel 102. The modularity of the air delivery barrel system 100 allows for a variety of payloads to be installed within the interior barrel 108 prior to packing of the main barrel 102 and then at a later time, the payloads can be quickly positioned within the main barrel 102. This allows for a variety of different payloads to be prepacked and then quickly positioned within the main barrel 102 as needed to deliver different payloads. In some implementations, different interior barrels 108 can used for different payloads, and the different interior barrels 108 can be identified with different markings, such as colors, numbers, identifiers, etc. For example, the interior barrels 108 may be color configured to visually denote different load-outs. This allows for the interior barrel 108 to be quickly swapped in and out dependent on mission requirements.

As shown in FIG. 3, the bottom of the main barrel 102 can be covered with a base plate 112 that includes wheels, or in another embodiment, a bare base plate 104 can be installed on the bottom of the main barrel 102. The modularity of the two different base plates, including the wheeled base plate 112 and the bare base plate 104 allows for the same air delivery barrel system 100 to be adapted to different mission parameters. The wheeled base plate 112 can be used when the air delivery barrel system 100 is deployed vertically on a static line and the wheeled base plate 112 allows the air delivery barrel system 100 to be wheeled around while positioned vertically. The different base plates may be designed to preserve the center of gravity of the air delivery barrel system 100 so it can still be easily manipulated. In other examples, the bare base plate 104 may be installed when the air delivery barrel system 100 is being deployed horizontally for a tandem jump. This modularity of the base plates allows the same air delivery barrel system 100 to be used for different deployments by simply switching out which base plate is used. This modularity of the base plate also reduces cost, for example, the bare base plate 104 can be used in certain situations instead of the more expensive wheeled base plate 112 that would be unnecessarily exposed to damage.

As shown in FIG. 3, the main barrel 102 may house one or more ballast plates 116 and/or one or more impact plates 114. In some embodiments, the base plate 112 secure the ballast plate 116 and/or the impact plate 114 in place. The ballast plates 116 are designed to fit within the main barrel 102 and have a similar profile as the interior barrel 108. The ballast plates 116 allow a load to be calculated and packaged to meet specific parameters for a jump, as described in more detail with respect to FIG. 13.

The impact plate 114 may reduce some of the impact force when the air delivery barrel system 100 makes contact with the ground during the landing phase. The impact plate 114 may be positioned within the main barrel 102 between the interior barrel 108 and the base plate 112. In some embodiments, the impact plate 114 may be able to flex and dissipate some of the energy created by the base plate 112 coming into contact with the ground. By dissipating some of the energy, the base plate 112 can protect both the payload in the interior barrel 108, a tandem jumper tethered to the air delivery barrel system 100, and/or the other components of the air delivery barrel system 100.

As shown in FIG. 3, in some embodiments, the main barrel 102 may have an attachment mechanism 122 to attach a horizontal wheel plate 118 and/or an attachment cover 120. The attachment mechanism 122 may couple to the horizontal wheel plate 118 by fasteners, such as screws, bolts, magnets, rods, pins, etc. In some embodiments, the attachment mechanism 122 may be adapted to receive a fastener (such as a screw, etc.) and may be molded out of the body of the main barrel 102 and include protrusions that allow a screw to be threaded through the wheel plate 118 and into the protrusions. As described in more detail elsewhere herein, the horizontal wheel plate 118 may be attached to the attachment mechanism 122 and allow the air delivery barrel system 100 to roll on wheels when resting horizontally on the horizontal wheel plate 118. This is advantageous during a tandem jump as the jumper 220 can push the main barrel 102 using the strap handles 124 and cause the air delivery barrel system 100 to roll out of the aircraft on the horizontal wheel plate 118. In further embodiments, the attachment cover 120 can be installed over the attachment mechanism 122 in order to protect the attachment mechanism 122 from damage. The modularity of the air delivery barrel system 100 allows for different configurations to be quickly deployed with only minor changes in components and at a much lower cost compared to previous solutions.

Figure 4:
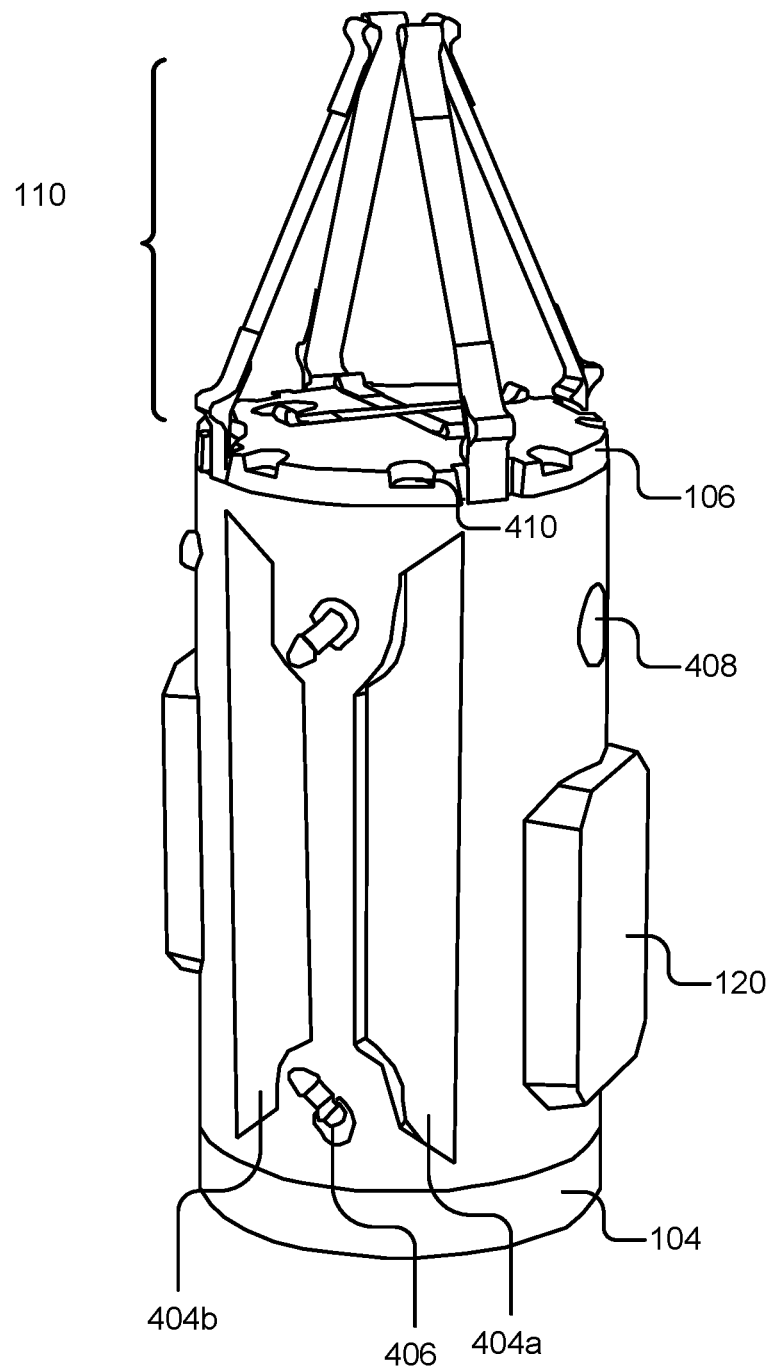
FIG. 4 illustrates another view of an example configuration for an air delivery barrel system.

In some embodiments, the interior barrel 108 can be positioned within the cavity formed out of the main barrel 102 to protect the payload within the interior barrel 108. One advantage of the air delivery barrel system 100 is the quick access to contents within the interior barrel 108. After the air delivery barrel system 100 has been set-up, the interior barrel 108 and/or the payload can be accessed by simply removing the detachable lid 106. This allows for payloads and configurations to be quickly set-up and changed for deployment. As shown in FIG. 4, in some embodiments, a payload can be determined and calculated for a safe tandem jump, based on the weight and configuration of the payload, additional ballast plates 116 and/or impact plate 114 can be placed within the main barrel 102 quickly before sliding the interior barrel 108 into the main barrel 102. The lid 106 can then be attached to the top edge of the main barrel 102 to secure the contents using attachment mechanisms described elsewhere herein. Once packed, the lid 106 can be reopened to add, remove, and/or check the contents of the interior barrel 108 without compromising the air delivery barrel system 100. In some embodiments, as needed, the system can be prepared in minutes and be deployed.

In some implementations, the air delivery barrel system 100 may be in the vertical deployment configuration. In the vertical deployment configuration, a wheeled base cap 112 may be installed on the bottom of the main barrel 102 and the attachment cover 120 protecting the attachment mechanism on the side of the main barrel 102. Vertical deployment allows the air delivery barrel system 100 to be wheeled around using the wheels on the bottom of the wheeled base cap 112. Vertical deployment may be used in static line as dumb bundle, smart bundle delivery systems, mass barrel deployments, and/or door bundle deployment.

In some implementations, the air delivery barrel system 100 may be in the horizontal deployment configuration with the horizontal wheel plate 118 and the bare base cap 104. Horizontal deployment allows the air delivery barrel system 100 to be wheeled around while the air delivery barrel system 100 is tipped in its side. Horizontal deployment may be used for tandem parachutist exits and/or single barrel static line deployment. In the different configurations, custom wheel carriages can be mounted on the air delivery barrel system 100 in different locations and used for different deployments. The wheel carriages may be mounted along the center of gravity in the different configuration and allow for smooth and rapid exits from the aircraft during deployment. In some embodiments, the wheels used in the wheel carriages may be molded out of a durable and soft thermoplastic material to help prevent damage to the aircraft floor. In specific examples, the wheels may be 3.5 inches, although other sizes and configurations are also contemplated.

FIG. 4 shows an example of another implementation of the air delivery barrel system. In some implementations, the main barrel 102 may be double walled and the channels for the strap system 110 may be housed between the double walls of the main barrel 102. Housing the strap system 110 between the double walls of the main barrel 102 prevents strap displacement and the outer wall provides protection to the strap system 110. In some implementations, the inner wall of the main barrel 102 is protected from punctures by the outer wall of the main barrel 102. This protection of the inner wall of the main barrel keeps the interior of the main barrel 102 water-tight even if the outer wall of the main barrel 102 is punctured and/or fails. In some implementations, the upper portion of the main barrel 102 may include an upper lip for reinforcement and durability of the main barrel 102. In further implementations, the lower portion of the main barrel 102 may include a lower lip for reinforcement and durability of the main barrel 102. In some embodiments, the main barrel 102 (and/or the other components of the air delivery barrel system 100) may be formed out of High Temperature Plastics ("HTP") or other polymers that are durable and capable of withstanding varying temperatures and having a high heat tolerance.

In some implementations, the outer wall of the main barrel may include cutout portions 404, such as 404a and 404b that are molded around the channels of the strap system that change the exterior profile of the main barrel 102. The cutout portions may allow for additional gear or accessories to be attached to the exterior of the main barrel 102, such as via the attachment mechanisms 406, such as a clip or ring. The cutout portions may also change the way the surface area of the main barrel 102 is affected by wind resistance during a jump. In some implementations, additional circular cutout portions 408 may be integrated into the outer wall of the main barrel 102 in order to provide additional attachments and/or reduce the weight of the main barrel 102. As shown in FIG. 4, the lid 106 and/or the end cap 112 may include cutout portions 410 around the mounting hardware 706 (see FIG. 7) that recess the mounting hardware 706 within the cutout portions 410 in order to protect the mounting hardware 706 from shearing off during an impact.

In some implementations, when the interior barrel 108 is placed within the main barrel 102 and the lid 106 is secured to the top of the main barrel 102, the system is ready for deployment. In some embodiments, the push handles 124a and 124b may be top mounted with a handle orientations at the 10 o'clock and 2 o'clock positions respectively, when viewed from behind the air delivery barrel system 100 in the horizontal deployment configuration. In some embodiments the push handles 124 may be six-eight inches in length and may provide a tandem master (e.g. "jumper") grab handles to push and/or guide the air delivery barrel system 100 out of the aircraft safely and vigorously as necessitated by the tandem jump.

The air delivery barrel system 100 can decrease build-up and packaging time using the modular components of the system. The modular design of the components allows for non-critical parts to be replaced when damaged, rather than full-system replacement. In some embodiments, a tool kit may also be provided for minor service and reconfiguration of the air delivery barrel system 100 as needed. In some implementations, when the air delivery barrel system 100 is packed, main barrel 102 may have a pressure release valve that can manage varying pressure changes as the system changes altitude during flight and deployment. In further embodiments, the air delivery barrel system 100 may also retain one or more characteristics of dust ingress resistance, chemical resistance, and/or flame resistance while also regulating the pressure changes.

FIG. 5 is an example of another implementation of the air delivery barrel system 500. In this example implementation, the air delivery barrel system 500 may include a wheel system 502 that is integrated into the outer surface of the main barrel 102. As shown in FIG. 5A, a back view of the air delivery barrel system 500 shows the wheel system 502 covering a portion of the back surface of the outer surface of the main barrel 102. Multiple wheels may be integrated into the wheel system 502 in order to disperse the weight of the air delivery barrel system 500 and increase the ease of movement when positioning and/or releasing the air delivery barrel system 500 during a delivery. FIG. 5B depicts a left side view of the air delivery barrel system 500. As shown in this example, the sides of the outer surface of the main barrel 102 may include cutout portions 406 as described elsewhere herein. FIG. 5C shows a front view of an air delivery barrel system 500. As shown in this example, the front outer surface of the main barrel may include various molded shapes, such as a flat surface to assist in stacking and/or storing multiple air delivery barrel systems or other materials. The molding pattern on the front outer surface of the main barrel 102 may improve the strength and durability of the main barrel 102 during an impact along specific surfaces. In some implementations, the lid 106 may mount on the main barrel 102 using a lid mounting bracket 124 that attaches the lid 106 to a top exterior surface of the main barrel 102. That may protect the mounting bracket 124 during an impact along the side and/or top of the lid 106 and increase the ability to reuse the air delivery barrel system 500 in multiple jumps. FIG. 5D depicts a right-side view of the area delivery barrel system, similar to the left side view depicted in FIG. 5B.

Figure 6A:
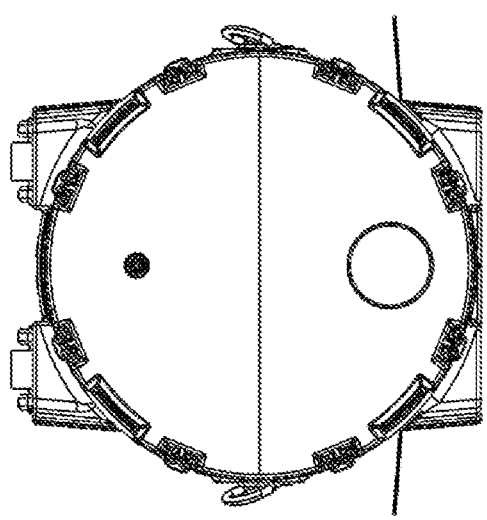
FIGS. 6A and 6B illustrate a top view and a bottom view an example configuration for an air delivery barrel system.
Figure 6B:
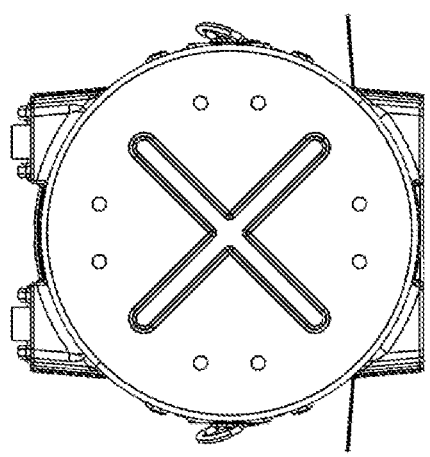

FIG. 6A is a top view of an example of another implementation of the air delivery barrel system 500 as described in FIGS. 5A-5D. FIG. 6B is a bottom view of an example of another implementation of the air delivery barrel system 500 as described in FIGS. 5A-5D. As shown in FIGS. 6A and 6B, the front surface is the air delivery barrel system 500 is substantially flat when the air delivery barrel system 500 is in the horizontal position, which allows for the air delivery barrel system 500 to be stacked or have other objects positioned on it.

FIGS. 7A and 7B illustrate the lid 106 and main barrel 102 of the air delivery barrel system 100. As shown in FIG. 7A, the lid 106 may be shaped to couple with the top of the main barrel 102 and create a water-resistant seal. In some embodiments, the lid 106 may include a lip that extends out from the edge of the lid 106. The lip may be adapted to receive attaching hardware 706 to couple the lid 106 to the top portion of the main barrel 102, such as by placing screw inserts into the main barrel 102, etc. For example, the lip may include one or more holes that line up with threaded holes in the main barrel 102 and are adapted to receive screws or other means of fastening the lid 106 to the main barrel 102. In the embodiment depicted in FIG. 7B the attaching hardware 706 may pass through the holes and screw into the threaded holes/inserts of the main barrel 102. In some embodiments, the attaching hardware 706 may include molded wings that can be used to tighten the attaching hardware 706 by hand, while in further embodiments, the attaching hardware may be compatible with various tools to secure the lid 106.

As shown in FIG. 7A, the main barrel 102 may be double walled and may include one or more strap channels 702. The strap channels 702 may include a cutout portion in the top edge of the main barrel 102. The cutout portion may allow the straps to pass through the top edge of the main barrel 102 while still allowing the lid 106 to seal the inner wall of the main barrel 102. In further embodiments, the strap channel 702 may keep the straps in place and prevent displacement of the strap system 110 during deployment. In some embodiments, the lid 106 may include one or more strap cutouts 704 within the lip of the lid 106. The strap cutouts may be compatible situated with the strap channel 702 of the main barrel 102 when the lid 106 is installed. The strap cutouts 704 may allow the strap system 110 to pass through the lid 106 without interfering with the strap system 110. It should be understood that any number of straps can be incorporated into the strap system 110 and a single strap may be suitable for some configurations while, two or more continuous straps may be used in a more complex strap system 110. It should be further understood that the strap cutouts 704 and/or strap channels 702 may also include any number of designs for different parameters. For example, the main barrel 102 may be configured for a single continuous strap with a single strap channel 702 on each side of the main barrel 102. While in one embodiment, while in further embodiments two or more strap channels 702 may be present on the main barrel 102 and any number of the strap channels 702 may be used or unused in a specific deployment to take advantage of the modular nature of the air delivery barrel system 100.

Figure 8B:
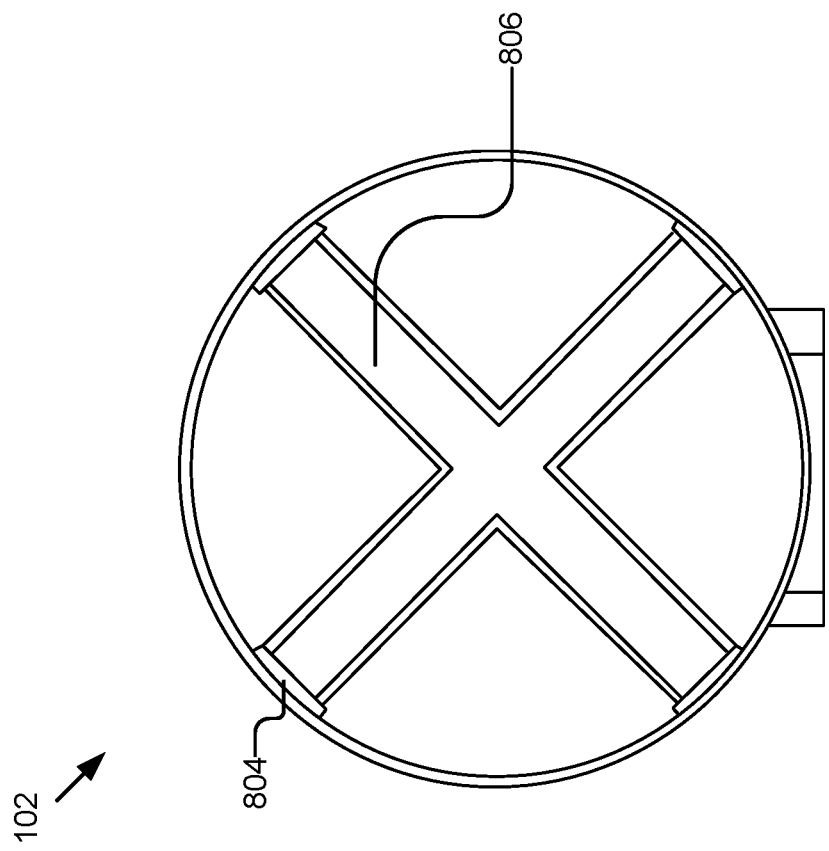
FIGS. 8A and 8B illustrates example configurations for components of an air delivery barrel system.
Figure 8A:
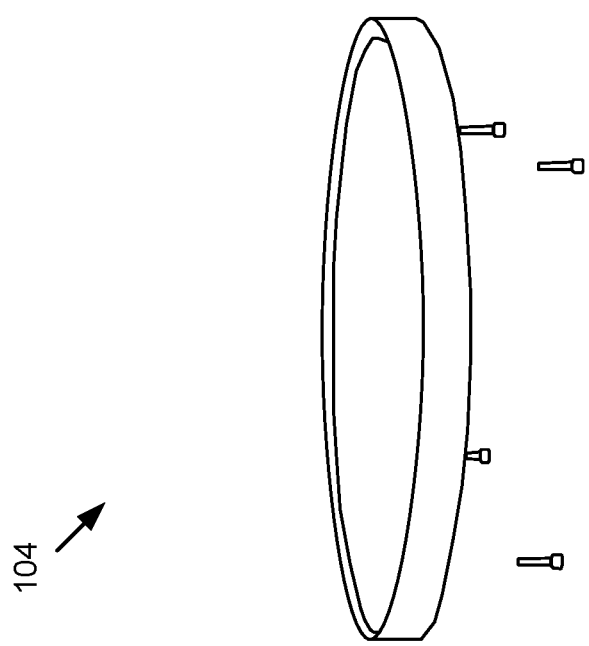

FIGS. 8A and 8B illustrate the base plate 104 and the bottom view of the main barrel 102. As shown in FIG. 8A, the base plate 104 may be sized to fit around the bottom edge of the main barrel 102. In some embodiments, the base plate 104 may include a lip that extends around the outside edge of the base plate 104 and around the bottom edge of the main barrel 102 when the base plate 104 is installed on the main barrel 102. It should be understood that the bare base plate 104 and the wheeled base plate 112 may be used interchangeably as a base plate for the bottom of the main barrel 102. The base plate 104 provides an additional impact protection to the main barrel 102 when the air delivery barrel system 100 impacts with the ground during deployment. In some implementations, during a normal landing, the base plate 104 is the first portion of the system to impact with the ground. In some embodiments, the rounded lip of the base plate 104 helps to additionally absorb some of the impact. The base plate 104 protects the bottom of the strap system 110 as shown in FIG. 8B from damage. The base plate 104 protects the continuous straps and/or the strap channels 806 from damage. As shown, the strap channels 806 run along the bottom of the main barrel 102. In some embodiments, the strap channels 806 may be channels molded into the bottom of the main barrel 102, while in further implementations, the strap channels 806 may not have any molded channel but may instead refer to the place where the strap system 110 passes along the bottom of the main barrel 102. The bottom of the main barrel 102 may also include one or more cutouts 804 that the strap system 110 may pass through between the double walls of the main barrel 102.

As shown in FIG. 8A, the base plate 104 may include mounting hardware that attaches the base plate 104 to the bottom of the main barrel 102. In some embodiments, the mounting hardware may include screws or other fasteners that may pass through holes in the base plate 104 and received into corresponding screw inserts integrated into the main barrel 102. In some embodiments, the mounting hardware may be designed to seat flat on the bottom of the base plate 104 when the base plate 104 is installed to avoid being sheared off on impact at landing. In some embodiments, the base plate 104 may include recesses that the mounting hardware may seat into in order to be flush with the bottom of the base plate 104 and avoid being sheared off on impact. In some embodiments, the base plate 104 may be field replaceable to repair a damaged base plate 104. The base plate 104 may be designed to absorb the impact on a landing and prevent damage to the rest of the main barrel 102 and/or strap system 110.

Figure 9B:
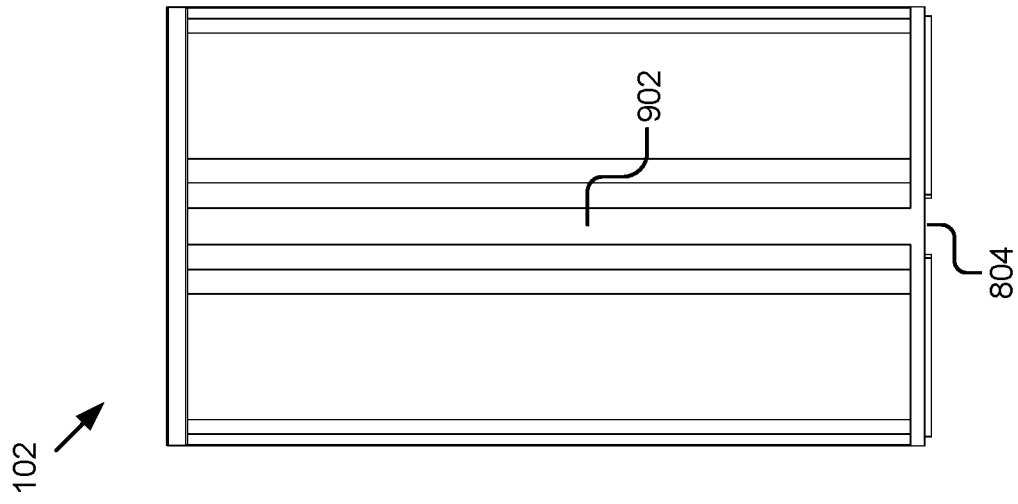
FIGS. 9A and 9B illustrate example configuration for components of an air delivery barrel system.
Figure 9A:
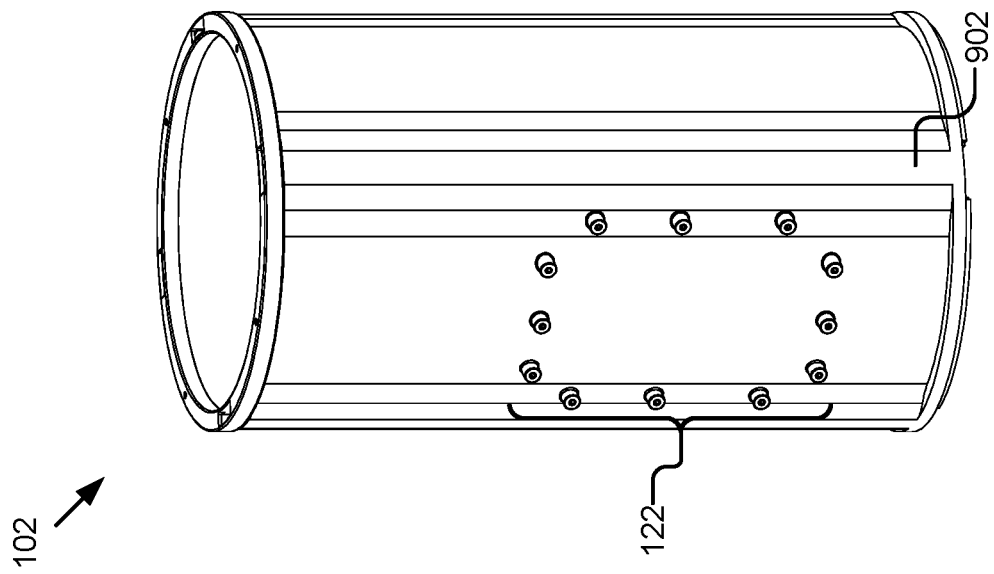

FIGS. 9A and 9B illustrate the main barrel 102 and the strap channels 902. In some embodiments, the main barrel 102 may be substantially cylindrical in shape and the strap channels 902 may be molded into the double wall of the main barrel 102. In further implementations, the main barrel 102 in not limited to the cylindrical shape may be shaped into other containers, such as a rectangular shape, etc. to adapt to various different payload parameters. The strap channels 902 may extend along the entire side of the main barrel 102 and have corresponding strap channels 902 on the opposite side of the main barrel 102 in order to allow for continuous straps of the strap system 110 to pass through the strap channels 902. As show in FIG. 9B, a lip in the bottom of the main barrel 102 may include the bottom strap channel 804 that is a recessed area for the strap to pass through as shown in FIG. 8B.

Figure 10B:
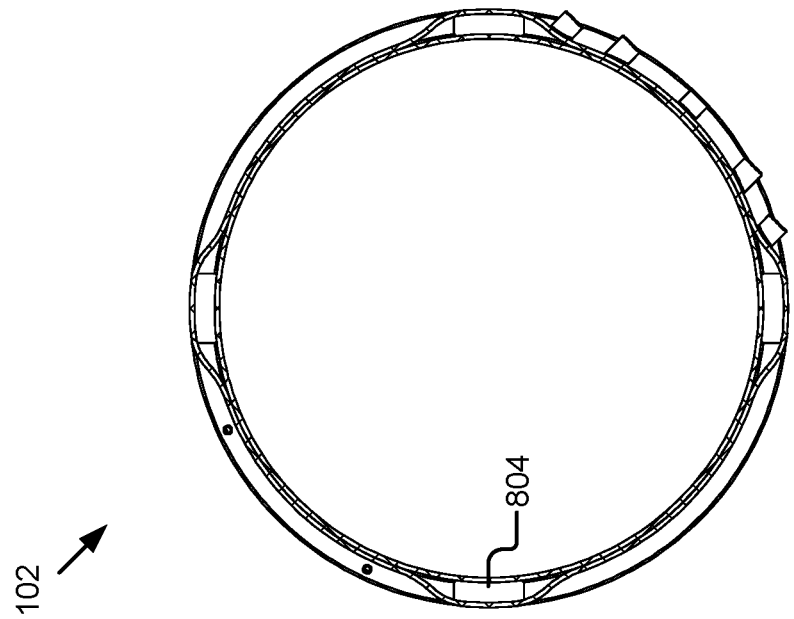
FIGS. 10A and 10B illustrate example configuration for components of an air delivery barrel system.
Figure 10A:
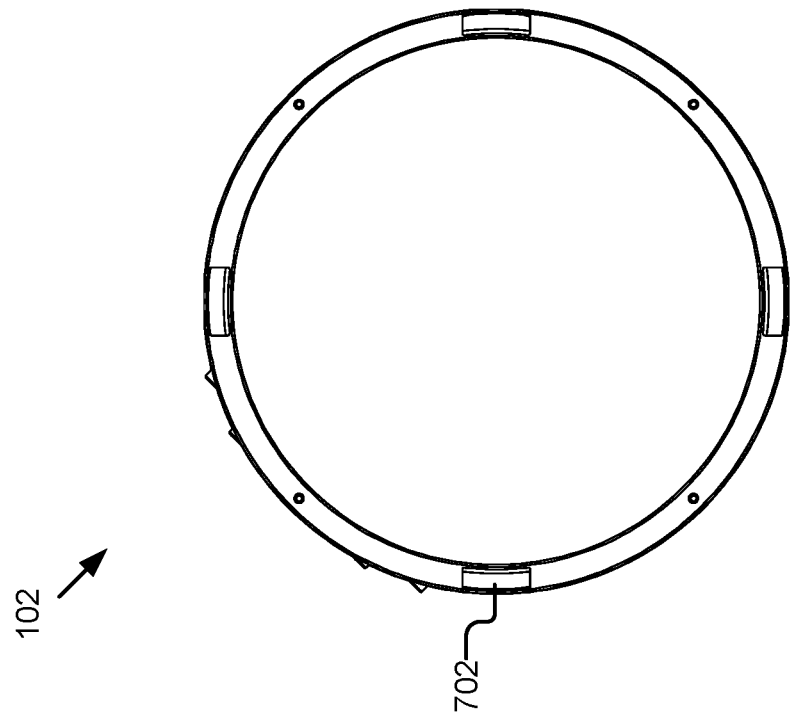

FIG. 10A is a top view of the main barrel 102 showing the substantially cylindrical shape of the main barrel 102. As shown, the main barrel 102 may include multiple strap channel cutouts 702 (four are shown in the example, although other embodiments are also contemplated) that allow straps to be passed through. FIG. 10B shows a cutout bottom view of the main body 102 showing the double walls of the main barrel 102 and the strap channel cutouts 804 on the bottom of the main barrel 102.

Figures 11A, 11B:
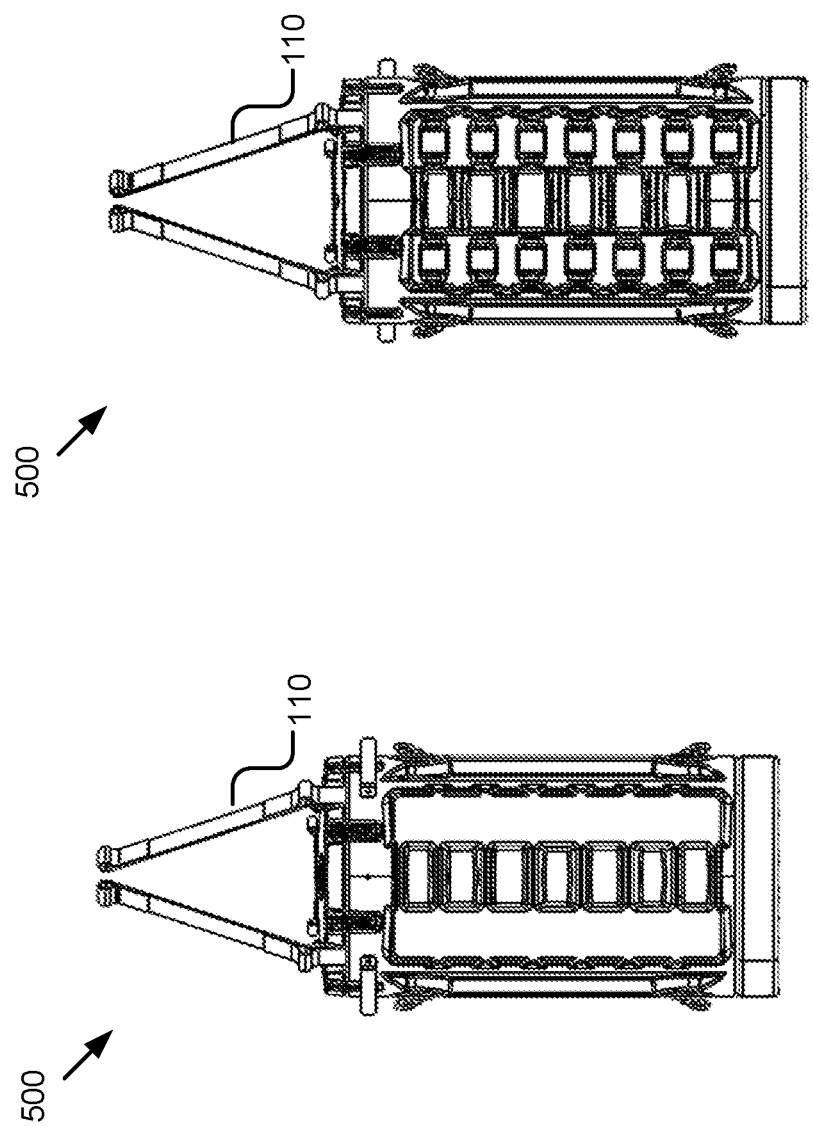
FIGS. 11A and 11B illustrate example configurations of an air delivery barrel systems.

FIGS. 11A-11B illustrate an example air delivery barrel system 500 with the strap system 110. FIG. 11A depicts a front view of the air delivery barrel system 500 with the strap system 110 extending out of the lid 106 of the air delivery barrel system 500. FIG. 11B depicts the back view of the air delivery barrel system 500 with the strap system 110 extending out of the lid 106 of the air delivery barrel system 500.

FIG. 12 illustrates an example interior barrel 108. The two-barrel system (main barrel 102 and interior barrel 108) allows end users to pre-pack and weigh mission specific loads into the interior barrel 108 before final assembly in the main barrel 102 at a later time. By prepacking the interior barrels 108, the interior barrels 108 can be packed in an efficient manner, such as at supply warehouses and then shipped and/or loaded into the air delivery barrel system 100 as needed. In some embodiments, the interior barrels 108 may be ordered with different color configurations and/or markings in order to quickly identify specific pre-packed mission and load profiles. In some embodiments, the interior barrel 108 may include custom strapping 1202 that makes it easier to lift the interior barrel 108 into and/or out of the main barrel 102. In some examples, the custom strapping 1202 may wrap horizontally around the exterior of the interior barrel 108, while in other examples, the custom strapping may extend vertically beyond the top edge of the interior barrel 108 in order to assist in pulling out the interior barrel 108 when installed inside of the main barrel 102. The custom strapping harness may wrap around at least a portion of the interior barrel 108 and can be used to grab and/or lift the interior barrel 108. The double barrel system that uses the main barrel 102 and the interior barrel 108 provides additional protection to the payload within the inner barrel 108.

Figure 13:
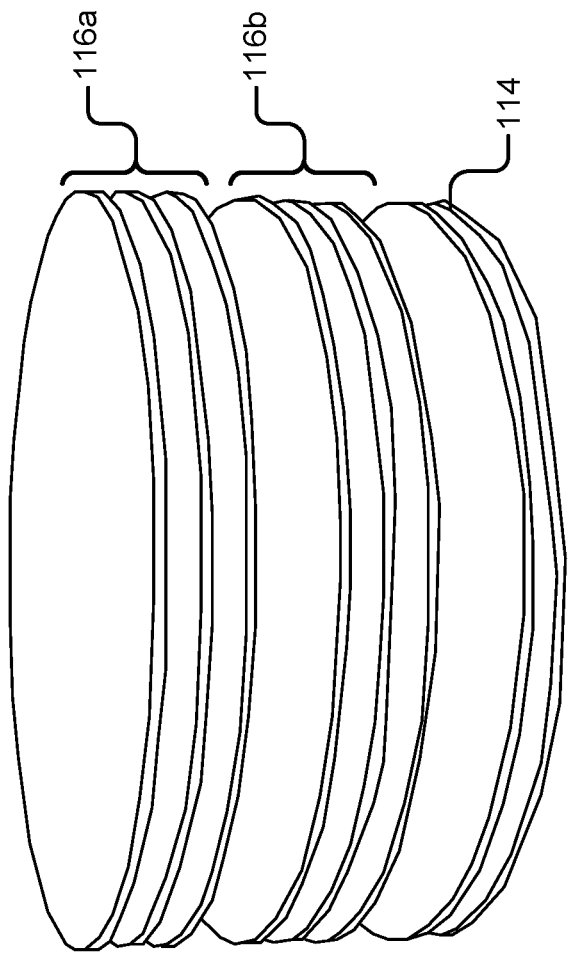
FIG. 13 illustrates an example configuration of components of an air delivery barrel system.

FIG. 13 illustrates components of the air delivery barrel system 100. The ballast plates 116 may be packed within the main barrel 102 in order to reach a desired exit weight of the system and achieve a desired terminal fall rate. In some embodiments the desired terminal fall rate is greater than the terminal fall rate of a jumper during freefall. The ballast plate 116 are designed to fit below the interior barrel 108 within the cavity of the main barrel 102 and change the weight of the system to achieve different fall rates. A fall rate calculation may be performed when the system is being packed to determine how many ballast plates 116 may be necessary. For example, if the diameter of the barrel is 31 inches and the minimum fall rate for the system is 160 mph, then the barrel weighing 200 lbs. with no/lightweight payload contents and a 1×150 lb. ballast plate 116 will achieve a safe fall rate of 160.9 mph. By performing the calculations and determining the necessary fall weight, the system can be quickly loaded with enough ballast plates 116 to safely be used in a tandem jump. In some embodiments, the ballast plates 116 may come in different sizes, such as a 25 lb.

weight, a 50 lb. weight, a 100 lb. weight, etc. The ballast plates 116 may be denoted by different colors and/or configurations to make it simple to quickly pack the appropriate configuration of ballast plates 116.

In some embodiments, spacer plates can be added in place of ballast plates 116, such as in the case of a heavy payload to maintain the interior barrel 108 position at an appropriate center of gravity. The spacer plate may be cylindrical in shape and configured to be placed below the interior barrel 108. The spacer plate may be made out of a lightweight material that maintains shape when the interior barrel 108 is resting on top of it, such as a plastic or light metal, etc.

In some embodiments, an impact plate 114 may be positioned within the cavity of the main barrel 102 and below the interior payload 108. In some embodiments the impact plate 114 may protect the interior barrel 108 by aiding in shock mitigation. The impact plate 114 may be designed to slow the deceleration of the load and reduce the impact and exit shocks as described elsewhere herein. The impact plate 114 may be formed out of a material designed to deform (in order to absorb some of the impact) under pressure, such as a rubber, foam, plastic, etc. The impact plate 114 may be placed beneath the interior barrel 108 and absorb some of the shock force. In some embodiments, the impact plate 114 may act as a spacer to fill up the space within the cavity of the main barrel 102 and keep the payload from moving around and being damaged.

In some embodiments, the air delivery barrel system 100 may be deployed with a location module that can determine a position of the system 100 during deployment and send the position to a remote receiver. For example, the location module may use GPS and/or Iridium positioning sensors to determine a precise location of the air delivery barrel system 100. In further embodiments, the location module can include software to control the system when the parachute is deployed, such as a JPAD module that can be attached to a steerable parachute and steered either autonomously and/or remotely by an operator. In some embodiments, the system can be steered by a jumper within line of sight of the bundle. The location module may be modular and attached to air delivery barrel system 100 as needed for mission parameters. By having the removable location module, the air delivery barrel system 100 can be quickly configured for use as a smart bundle that can be controlled in flight when installed or as a dumb bundle without the location module installed, without repacking the payload. In further embodiments, the location module may be attached using attachment mechanism 122 and/or an alternative attachment mechanism and the attachment may have a separate cover when the location module is not installed.

In one example the air delivery barrel system 100 may be deployed out of an aircraft attached to a square steerable parachute over a calculated release point. The location module can be GPS/Iridium guided by onboard steering systems and/or steered by a jumper within line of sight of the bundle under canopy. In further embodiments, the air delivery barrel system 100 can be loaded with ordinance payload and/or made from explosive materials and be inexpensively used as an explosive compared to other available options. Using the location module and the smart delivery system, the air delivery barrel system 100 can be offset from the aircraft it is deployed from by up to thirty miles and push out payloads without the deploying aircraft being near. The air delivery barrel system 100 can travel to a predetermined GPS location either autonomously or remotely by an aircrew. In some embodiments, the payload can be tailored based on target composition and/or intended explosive effect. The interior barrel 108 may be made out of and/or lined with explosives. In further embodiments, the bottom of the main barrel 102 may be lined with cutting charges operable to blow out of the bottom of the barrels and smaller form ordinance can be deployed. In further embodiments, the air delivery barrel system 100 could be deployed with the cutting charges to deploy leaflets after the aircraft is safely away and not exposing the aircraft to surface to air threats.

The air delivery barrel system 100 may be designed with different sized main barrel 102 and components dependent on the payload and it should be understood that various sizes are contemplated based on different payloads. In one example embodiment, the air delivery barrel system 100 may be used for personnel deployment. In this example, a bigger main barrel 102 and interior barrel 108 system are contemplated that could seat one or more people within the interior barrel 108. The interior barrel 108 may include harnesses and/or break away seats for the personnel to be secured in during deployment. The air delivery barrel system 100 may incorporate the shock absorption strategies of the continuous strap system 110 and/or the impact plate 114 to absorb the impact shocks and prevent injury to personnel deployed in the system. The interior barrel 108 may be pressurized to prevent injury to the personnel during deployment. In some embodiments, the interior barrel 108 may be packed with additional gear, such as a ladder if the air delivery barrel system 100 gets stuck in a tree, etc. This personnel delivery system decreases cost and injuries currently associated with personnel deployment since training would not be required to deploy the personnel in the air delivery barrel system 100 and injuries from training would decrease.

FIG. 14 depicts an air delivery barrel system 100 with different sized end cap configurations. The air delivery barrel system 100 can be fitted with various diameters of sized end caps 1400a-c as shown in FIG. 14. The end cap diameter is considered when determining the terminal velocity fall rate in relation to the weight of the entire air delivery barrel system 100. The range of the speed of the air delivery barrel system 100 when in freefall can be controlled (such as by slowing the speed of the air delivery barrel system 100) as weight of the air delivery barrel system 100 is increased by changing the diameter of the air delivery barrel system 100 using various sized end caps 1400. For example, the sized end caps 1400a-1400c may be various different sizes that are detachably connectable to the air delivery barrel system 100. For example, sized end caps 1400a-1400c may be different sized diameters that can connect to the air delivery barrel system 100. It should be understood that various sizes of sized base caps 1400 may be designed and used, based on various sizes of load weights. The various sized end caps 1400a-1400c may be used with the air delivery barrel system 100 to control the speed of the air delivery barrel system 100 in freefall, where adding a greater diameter sized end cap 1400 will increase the surface area presented to the air column during flight and in turn decrease the velocity of the air delivery barrel system 100. By reducing and/or controlling for the speed of the air delivery barrel system 100, the exit shock and/or opening shock of the air delivery barrel system 100 can be reduced, which prevents injury to the jumper and/or damage to equipment.

In some implementations, the sized end caps 1400 may be directly attached to the main barrel 102 in place of the wheeled base plate 112 and/or the bare end cap 104. In further implementations, a base cap adapter (not shown) may be used to quickly attach various sized base caps 1400 in order to facilitate a quick and simple assembly between various sized base caps 1400 for different air delivery barrel system 100 weights. In some implementations, the adapter (not shown) may connect to the existing base plate (such as 112 or 104) and allow the sized base cap 1400 to attach to the rest of the air delivery barrel system 100.

Figure 15A:
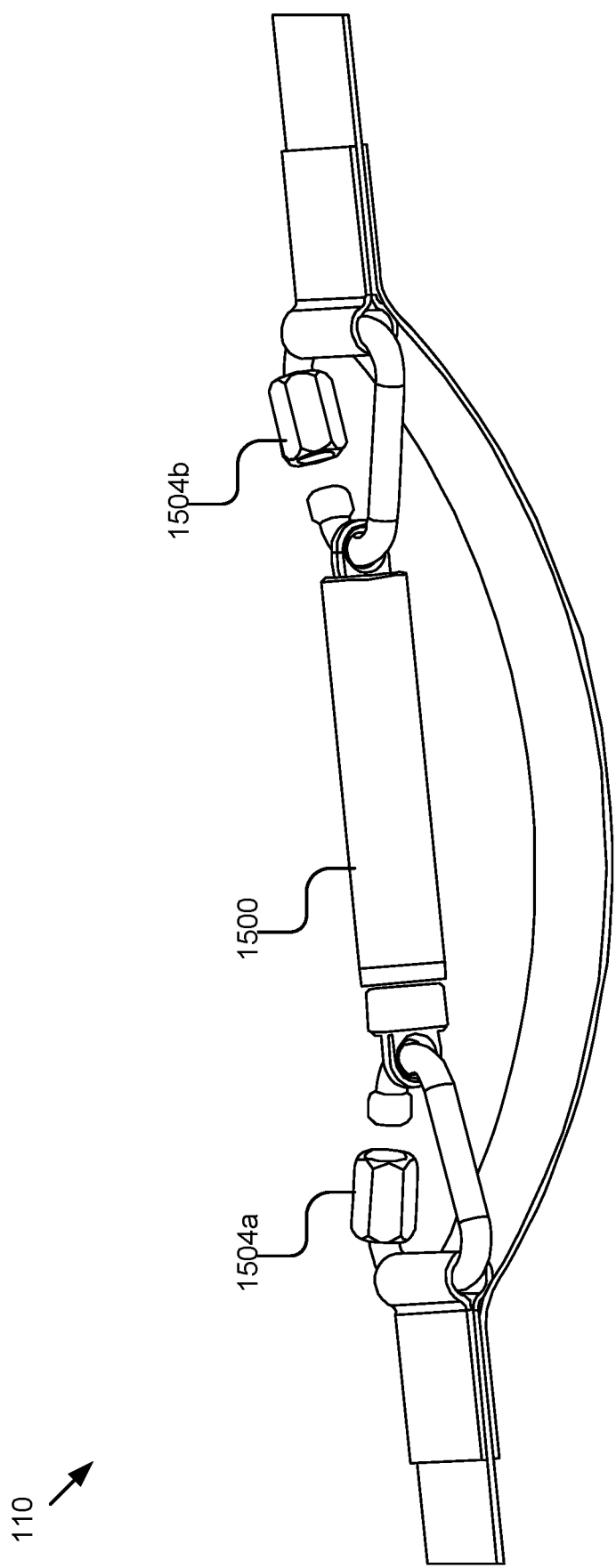
FIGS. 15A-15C illustrate an example air shock absorption strap system of an air delivery barrel system.

FIG. 15A depicts a shock absorption systems 1500 to reduce one or more of the exit shock, impact shock, and/or opening shock loads. In some implementations, the shock absorption systems 1500 may be one or more of hydraulic, spring, and/or air shock absorbers that are formed into the form factor of the air delivery barrel system 100 and/or the strap system 110. As shown in FIG. 15, in one implementation, the shock absorption system 1500 may include a shock absorber that is directly integrated into the strapping system 110 to reduce the shock loads at various points during deployment of the air delivery barrel system 100. In some implementations, the shock absorber system 1500 may integrate into the strap system 110 by using an attaching clip 1504, that may attach at both ends of the shock absorber system 1500 and loop in-line with the strap system 110. It should be understood that while the example in FIG. 15 depicts the shock absorber system 1500 integrated into the strap channel 110, it could also be formed to integrate above the strap channels and/or other form factors of the main barrel 102 to protect the shock absorbers from damage.

Figure 15C:
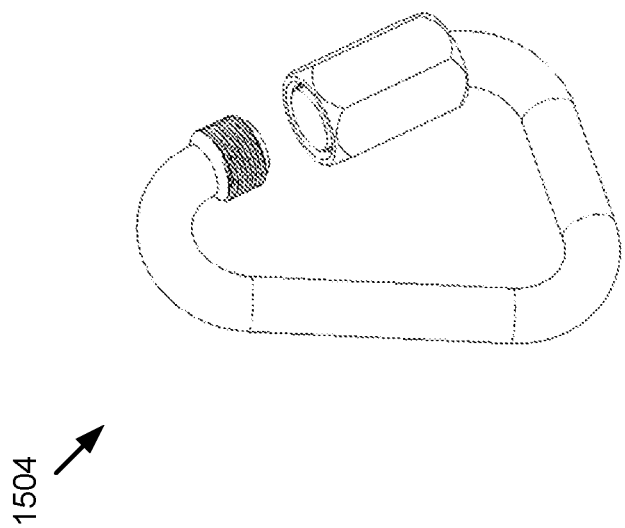
Figure 15B:
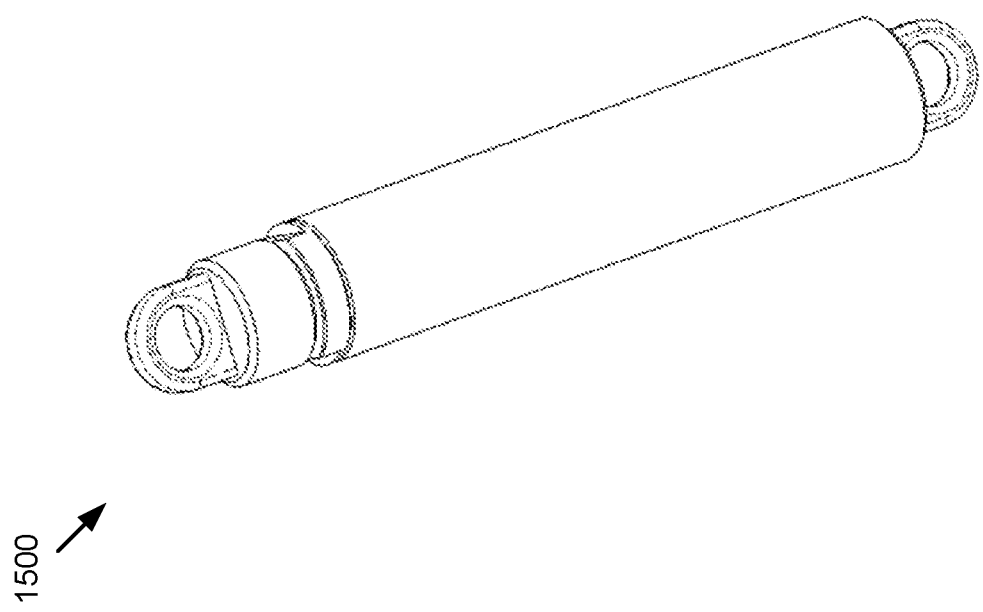

As shown in FIG. 15B, in some implementations, that the shock absorber system 1500 can be detachable and various strengths of shock absorber systems 1500 can be connected to the air delivery barrel system 100 in order to account for different weights of the load and/or the speed and projected shock loads of the air delivery barrel system 100. The shock absorber system 1500 may be designed to be removable in field for various different load parameters and different shock absorbers 1500 may be integrated for different load parameters. By incorporating the shock absorber system 1500, the exit shock, opening shock, and/or the load shock of the air delivery barrel system 100 may be reduced to increase the safety of the jumper and/or the equipment. By using this shock absorber system 1500 in the air delivery barrel system 100, a safer delivery system can be used to prevent injury to the jumper and/or damage to the load. As shown in FIG. 15C, the attaching clip 1504 may be a separate component, such as a locking clip or other type of quick attaching mechanism.

Figure 16E:
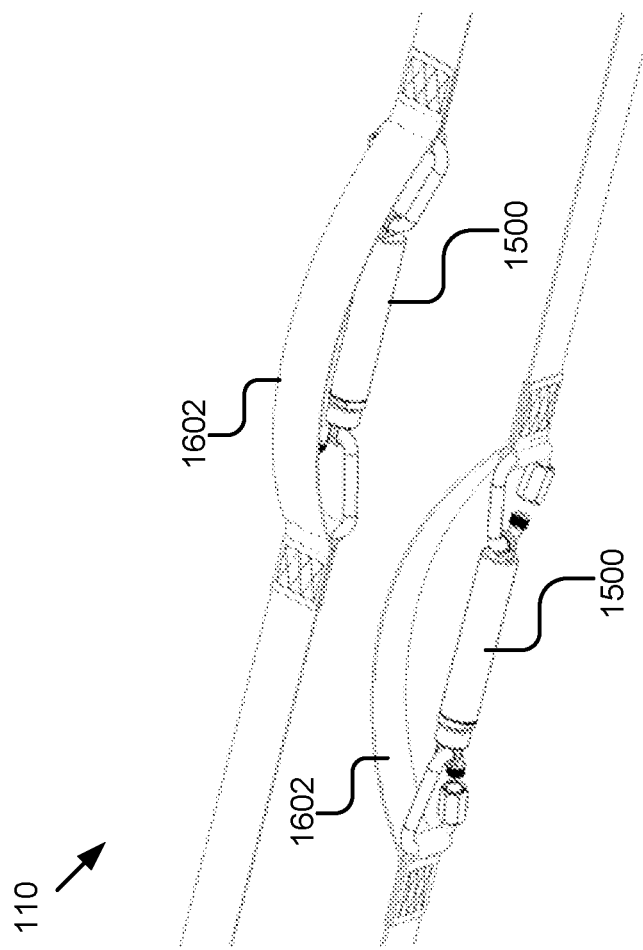

FIGS. 16A-16G show various configurations of the strap system 110 that includes a shock absorber system 1500. As shown in FIG. 16A, in some implementations, the strapping system (shown without being positioned within the air delivery barrel system 100) may include one or more in-line strap loops 1602. These in-line strap loops may include a double over portion of strap material and attachment mechanisms at both ends of the in-line strap loops. As shown in FIG. 16B, the shock absorber system 1500 is designed to fit loosely within the in-line strap lops 1602 such that when a force or load is applied to the strap system 110, the shock absorber may flex and absorb the shock within the in-line strap loop 1602. As shown in FIG. 16C, the in-line strap loops 1601 may be integrated into one or more of the strap system straps. In further implementations, additional in-line strap loops (not shown) may be included in a single strap of the strap system 110, which allows for multiple shock absorber systems 1500 to be added as needed into the strap system 110.

Figure 16D:
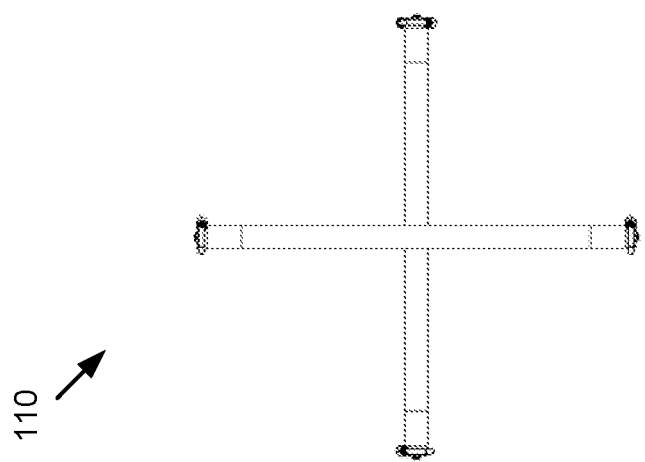
Figures 16F, 16G:
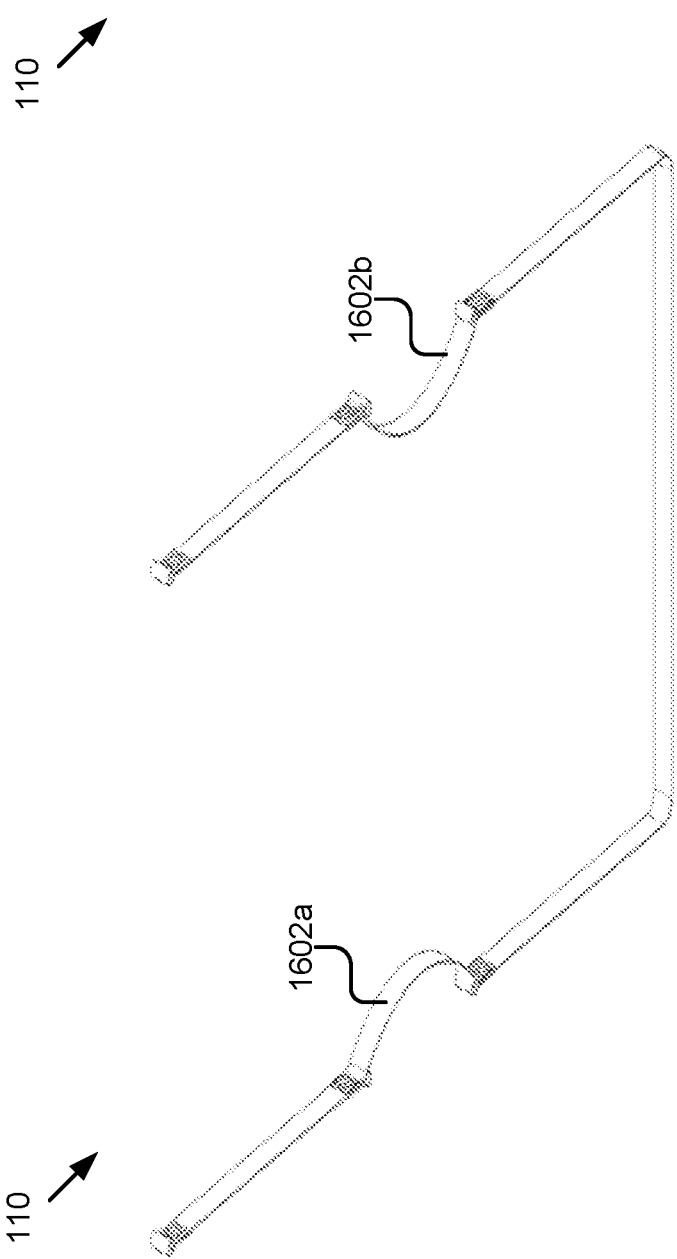

FIG. 16D illustrates an example of the continuous strap system 110 from a top view that may include the shock absorber system 1500. As shown in FIG. 16D, the continuous strap system may cross along the bottom of the main barrel 102 when positioned in the strap channels to create the continuous strap system. FIG. 16E illustrates another example of the shock absorber system 1500 in the in-line strap loop 1602. As shown in the side and rear perspective views of the strap system 110, the shock absorber system 1500 may be positioned within the in-line strap loop 1602. FIG. 16F illustrates an example of a single strap from the continuous strap system with in-line strap loop 1602a and in-line strap loop 1602b on opposite sides of the single strap. FIG. 16G illustrates an example of the in-line strap loop 1602 without a shock absorber system 1500. In some implementations, the strap system 110 may operate with or without the shock absorber system 1500 installed, based on various load parameters.

It should be understood that the above-described example embodiments are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the hardware and technology described herein may be practiced without these specific details. Various implementations are described as having particular hardware, software, and technology. However, the present disclosure applies to any type of device that can receive data and commands, and to any peripheral devices providing services.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. An air delivery barrel system comprising:
a strap system that provides line stretch of the strap system when a force is exerted on the strap system, the strap system including a continuous strap; and
a barrel, the barrel being formed out of a cylindrically shaped wall and the cylindrically shaped wall including an enclosed channel formed out of the cylindrically shaped wall that the strap system passes through, wherein the barrel is configured to protect a load positioned within the barrel.

2. The air delivery barrel system of claim 1, wherein the load is removable from the barrel.

3. The air delivery barrel system of claim 2, wherein the barrel is a first barrel and wherein the load is a second barrel that can be modularly positioned within the first barrel.

4. The air delivery barrel system of claim 1, wherein the strap system line stretch absorbs a portion of the force.

5. The air delivery barrel system of claim 1, wherein the continuous strap includes a first end that passes through the enclosed channel of the barrel, the first end including an attachment loop.

6. The air delivery barrel system of claim 1, further comprising a lid, wherein the lid is detachably connectable to a top end of the barrel and the lid includes a recess that the continuous strap passes through.

7. The air delivery barrel system of claim 6, wherein the continuous strap includes a gear loop, wherein the gear loop prevents an end of the continuous strap from sliding back into the enclosed channel.

8. The air delivery barrel system of claim 6, wherein the barrel is one or more of watertight and dust proof when the lid is connected to the barrel.

9. The air delivery barrel system of claim 1, wherein the strap system includes an integrated shock absorber.

10. The air delivery barrel system of claim 1 wherein the strap system is a type 8 webbing strap.

11. The air delivery barrel system of claim 1, further comprising an end cap being detachably connectable to a bottom end of the barrel, wherein the end cap is designed to preserve a center of gravity of the air delivery barrel system when positioned on the bottom of the barrel.

12. The air delivery barrel system of claim 11, wherein the end cap is a wheeled end cap.

13. The air delivery barrel system of claim 1, further comprising:
a ballast plate that can be removable positioned within the barrel, wherein the ballast plate can be included within the barrel to bring a load weight of the barrel to a specific parameter.

14. The air delivery barrel system of claim 1, further comprising:
an impact plate that can be removable positioned within the barrel, wherein the impact plate being configured to flex and dissipate impact energy.

15. The air delivery barrel system of claim 1, wherein the barrel includes an attachment mechanism that can be configured to receive a horizontal wheel plate.

16. The air delivery barrel system of claim 1, wherein the barrel is double walled formed out of an interior wall and an exterior wall and the enclosed channel is positioned between the interior wall and the exterior wall.

17. The air delivery barrel system of claim 16, further comprising:
a push handle integrated into the barrel, the push handle protruding outwardly from the exterior wall of the barrel.

18. An air delivery barrel system comprising:
a barrel including an enclosed strap channel located between an exterior wall and an interior wall of the barrel;
a strap system formed out of a continuous strap that passes through the enclosed strap channel of the barrel, the enclosed strap channel being configured to reduce a shock on the barrel; and
a load configured to be removably positioned within the barrel and protected by the exterior wall and the interior wall of the barrel.

19. The air delivery barrel system of claim 18, wherein the barrel is configured in one of a vertical configuration and a horizontal configuration.

20. An air delivery barrel system comprising:
a barrel that houses an enclosed strap channel that runs from a top side of the barrel to a bottom side of the barrel;
a load configured to be positioned within the barrel and protected by the barrel; and
a strap system that passes through the enclosed strap channel and is configured to reduce a shock that is applied to the strap system.

* * * * *